(12) United States Patent
Kobayashi et al.

(10) Patent No.: US 10,866,203 B2
(45) Date of Patent: Dec. 15, 2020

(54) STRESS SENSOR

(71) Applicant: KYOCERA Corporation, Kyoto (JP)

(72) Inventors: Kyohei Kobayashi, Joyo (JP); Ryo Ueno, Uji (JP); Shinichi Abe, Uji (JP); Hisashi Sakai, Kyotanabe (JP); Masaru Nagata, Kyotanabe (JP); Takanori Yasuda, Nara (JP)

(73) Assignee: KYOCERA Corporation, Kyoto (JP)

( * ) Notice: Subject to any disclaimer, the term of this patent is extended or adjusted under 35 U.S.C. 154(b) by 45 days.

(21) Appl. No.: 16/089,568

(22) PCT Filed: Mar. 29, 2017

(86) PCT No.: PCT/JP2017/013026
§ 371 (c)(1),
(2) Date: Sep. 28, 2018

(87) PCT Pub. No.: WO2017/170748
PCT Pub. Date: Oct. 5, 2017

(65) Prior Publication Data
US 2019/0120781 A1   Apr. 25, 2019

(30) Foreign Application Priority Data

Mar. 31, 2016  (JP) ................ 2016-072666
Mar. 31, 2016  (JP) ................ 2016-072668
(Continued)

(51) Int. Cl.
*G01N 27/12*   (2006.01)
*G01N 19/00*   (2006.01)
(Continued)

(52) U.S. Cl.
CPC ........... *G01N 27/12* (2013.01); *G01L 1/18* (2013.01); *G01L 1/2293* (2013.01); *G01N 19/00* (2013.01)

(58) Field of Classification Search
CPC .......... G01N 27/12; G01N 19/00; G01L 1/18; G01L 1/2293
(Continued)

(56) References Cited

U.S. PATENT DOCUMENTS 3,278,881 A    10/1966  Anderson et al.
4,376,929 A *   3/1983  Myhre ................ G01L 9/0051
                                              216/2

(Continued)

FOREIGN PATENT DOCUMENTS

CN    102089638 A    6/2011
CN    105181217 A   12/2015
(Continued)

OTHER PUBLICATIONS

Translation of JP-2012122924-A (provided by Applicant) (Year: 2012).*
(Continued)

*Primary Examiner* — Nathaniel T Woodward
(74) *Attorney, Agent, or Firm* — Kenja IP Law PC

(57) ABSTRACT

A stress sensor comprises: a diaphragm; an intermediate layer disposed on a surface of the diaphragm; a sensitive membrane disposed on the intermediate layer; and a piezoresistive element disposed in a region of the diaphragm in contact with an outer edge of the intermediate layer.

17 Claims, 20 Drawing Sheets

(30) Foreign Application Priority Data

| Mar. 31, 2016 | (JP) | 2016-072672 |
|---|---|---|
| Mar. 31, 2016 | (JP) | 2016-072675 |
| Mar. 31, 2016 | (JP) | 2016-072678 |
| Mar. 31, 2016 | (JP) | 2016-072681 |
| Mar. 31, 2016 | (JP) | 2016-072685 |
| Mar. 31, 2016 | (JP) | 2016-072691 |

(51) Int. Cl.
 *G01L 1/22* (2006.01)
 *G01L 1/18* (2006.01)

(58) Field of Classification Search
 USPC ............................................. 73/35.05
 See application file for complete search history.

(56) References Cited

U.S. PATENT DOCUMENTS

| 4,618,397 | A | * | 10/1986 | Shimizu | G01L 9/0042 |
| | | | | | 438/53 |
| 4,622,856 | A | * | 11/1986 | Binder | G01L 1/2262 |
| | | | | | 29/593 |
| 5,110,373 | A | * | 5/1992 | Mauger | B81C 1/00666 |
| | | | | | 148/33.2 |
| 5,514,898 | A | * | 5/1996 | Hartauer | G01L 9/0042 |
| | | | | | 257/417 |
| 5,563,341 | A | * | 10/1996 | Fenner | G01N 19/10 |
| | | | | | 73/335.11 |
| 5,736,430 | A | * | 4/1998 | Seefeldt | B81C 1/00158 |
| | | | | | 438/53 |
| 6,122,975 | A | * | 9/2000 | Sridhar | G01L 9/0042 |
| | | | | | 73/754 |
| 7,863,696 | B2 | | 1/2011 | Takizawa et al. | |
| 7,986,017 | B2 | | 7/2011 | Takizawa et al. | |
| 8,733,176 | B2 | | 5/2014 | Li | |
| 9,212,959 | B2 | | 12/2015 | Yoshikawa et al. | |
| 9,506,822 | B2 | | 11/2016 | Yoshikawa et al. | |
| 2004/0223884 | A1 | * | 11/2004 | Chen | G01N 29/036 |
| | | | | | 422/88 |
| 2008/0092649 | A1 | * | 4/2008 | Chen | G01N 27/048 |
| | | | | | 73/335.05 |
| 2009/0184381 | A1 | | 7/2009 | Takizawa et al. | |
| 2009/0301176 | A1 | | 12/2009 | Rowe et al. | |
| 2011/0048138 | A1 | * | 3/2011 | Li | B81B 3/0086 |
| | | | | | 73/721 |
| 2011/0067484 | A1 | | 3/2011 | Takizawa et al. | |
| 2013/0111977 | A1 | | 5/2013 | Offermans et al. | |
| 2013/0133433 | A1 | | 5/2013 | Yoshikawa et al. | |
| 2013/0219994 | A1 | | 8/2013 | Bilic et al. | |
| 2014/0352447 | A1 | | 12/2014 | Yoshikawa et al. | |

FOREIGN PATENT DOCUMENTS

| EP | 0372092 | A1 | | 6/1990 |
|---|---|---|---|---|
| JP | S5577178 | A | | 6/1980 |
| JP | S6228153 | U | | 2/1987 |
| JP | S63155774 | A | | 6/1988 |
| JP | H01315172 | A | | 12/1989 |
| JP | H0328741 | A | | 2/1991 |
| JP | H06128721 | A | | 5/1994 |
| JP | H10300603 | A | | 11/1998 |
| JP | 2000214072 | A | | 8/2000 |
| JP | 2001124797 | A | | 5/2001 |
| JP | 2002071492 | A | | 3/2002 |
| JP | 2005037383 | A | | 2/2005 |
| JP | 2007170830 | A | | 7/2007 |
| JP | 2009519454 | A | | 5/2009 |
| JP | 2009174960 | A | | 8/2009 |
| JP | 2010261766 | A | | 11/2010 |
| JP | 2012122924 | A | | 6/2012 |
| JP | 2012122924 | A | * | 6/2012 |
| JP | 2015143713 | A | | 8/2015 |
| WO | 2010089234 | A1 | | 8/2010 |
| WO | 2011148774 | A1 | | 12/2011 |
| WO | 2013157581 | A1 | | 10/2013 |

OTHER PUBLICATIONS

Jul. 4, 2017, International Search Report issued in the International Patent Application No. PCT/JP2017/013026.

\* cited by examiner

STRESS SENSOR

CROSS REFERENCE TO RELATED APPLICATION

This application claims priority to and the benefit of Japanese Patent Application No. 2016-072668 filed on Mar. 31, 2016, Japanese Patent Application No. 2016-072666 filed on Mar. 31, 2016, Japanese Patent Application No. 2016-072672 filed on Mar. 31, 2016, Japanese Patent Application No. 2016-072675 filed on Mar. 31, 2016, Japanese Patent Application No. 2016-072678 filed on Mar. 31, 2016, Japanese Patent Application No. 2016-072681 filed on Mar. 31, 2016, Japanese Patent Application No. 2016-072685 filed on Mar. 31, 2016, and Japanese Patent Application No. 2016-072691 filed on Mar. 31, 2016, the entire disclosures of which are incorporated herein by reference.

TECHNICAL FIELD

The present disclosure relates to a stress sensor.

BACKGROUND

Sensors for detecting pressure or stress using diaphragms are conventionally known. For example, a pressure sensor detects pressure applied to a diaphragm on the basis of the deflection of the diaphragm.

SUMMARY

A stress sensor according to an aspect of the present disclosure comprises a diaphragm, an intermediate layer, a sensitive membrane, and a detector. The intermediate layer is disposed on a surface of the diaphragm. The sensitive membrane is disposed on the intermediate layer. The detector is disposed in a region of the diaphragm in contact with an outer edge of the intermediate layer.

DETAILED DESCRIPTION

Some embodiments of the present disclosure are described below, with reference to drawings. The embodiments described below assume that, as a result of a substance being adsorbed by a membrane (sensitive membrane) disposed on a surface of a diaphragm, the diaphragm deforms and is stressed. The drawings used in the following description are schematic.

Embodiment 1

Figure 1:
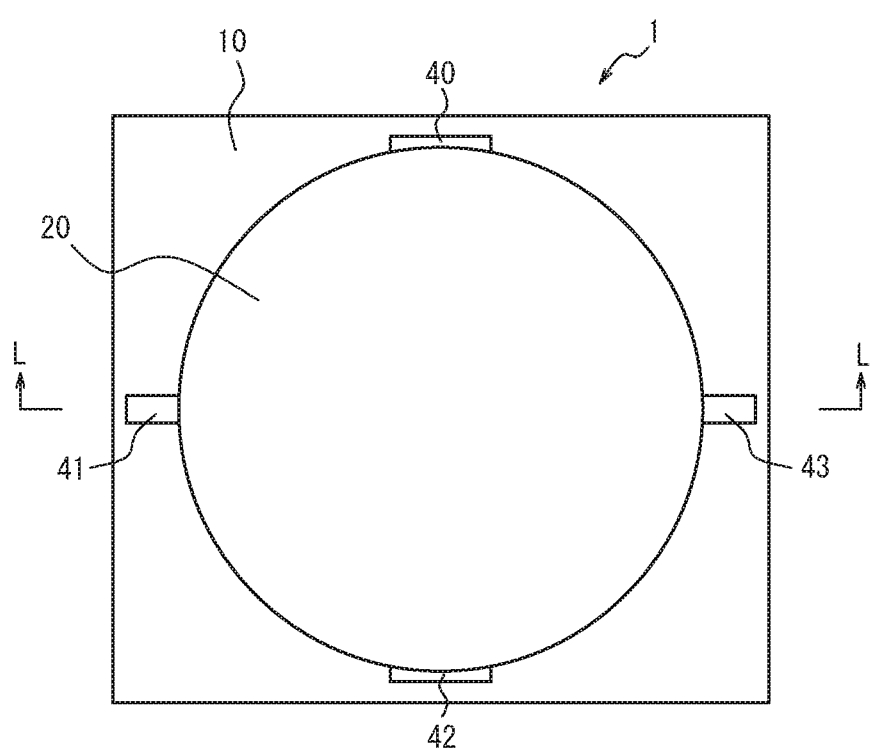
FIG. 1 is a top view illustrating the schematic structure of a stress sensor according to Embodiment 1.
Figure 1:
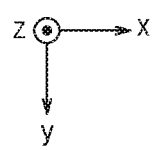
Figure 2:
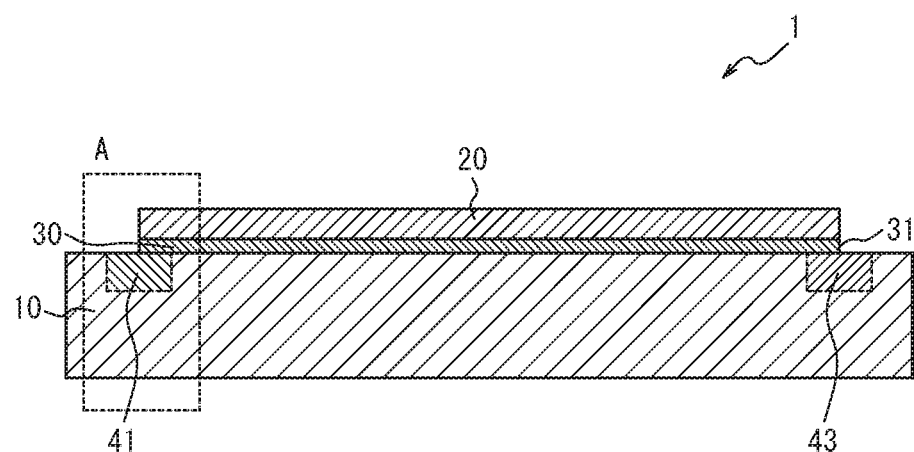
FIG. 2 is a sectional view along L-L line of the stress sensor illustrated in FIG. 1.
Figure 2:
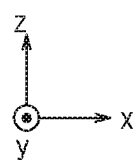

FIG. 1 is a top view illustrating the schematic structure of a stress sensor 1 according to Embodiment 1. FIG. 2 is a sectional view along L-L line of the stress sensor 1 illustrated in FIG. 1. Herein, the z-axis positive direction corresponds to the upward direction, and the z-axis negative direction corresponds to the downward direction.

The stress sensor 1 includes a diaphragm 10, a sensitive membrane 20, an intermediate layer 30, and four piezoresistive elements (detectors) 40, 41, 42, and 43. The intermediate layer 30 is disposed on the upper surface of the diaphragm 10, and the sensitive membrane 20 is disposed on the upper surface of the intermediate layer 30. By the sensitive membrane 20 adsorbing a specific substance in a fluid, the stress sensor 1 detects the substance in the fluid. For example, a gas is blown on the stress sensor 1 from the upper surface side. The stress sensor 1 is capable of detecting whether predetermined gas molecules to be detected are contained in the blown gas. The stress sensor 1 is manufactured, for example, using a silicon on insulator (SOI) substrate. An example of a method of manufacturing the stress sensor 1 will be described later.

The diaphragm 10 is a deformable member. The diaphragm 10 is, for example, a thin substrate. For example, the diaphragm 10 can be used as an n-type second substrate. The diaphragm 10 is rectangular in a top view, as illustrated in FIG. 1. The diaphragm 10 is formed integrally with a substrate thicker than the diaphragm 10, around its periphery. When the sensitive membrane 20 disposed on the upper surface deforms, the diaphragm 10 deforms depending on the degree of deformation of the sensitive membrane 20, through the intermediate layer 30.

The sensitive membrane 20 is circular in a top view in this embodiment. The sensitive membrane 20, when a substance to be detected is adsorbed by its surface, deforms by swelling, expansion, contraction, elongation, or the like due to, for example, physical contact with the substance or a chemical reaction with the substance. The sensitive membrane 20 is made of a material in accordance with the substance to be detected. Examples of the material of the sensitive membrane 20 include polystyrene, chloroprene rubber, polymethylmethacrylate, vinyl acetate, chloroethylene, epoxy resin, nitrocellulose, methacrylate resin, and polyvinylpyrrolidone.

The intermediate layer 30 is a thin membrane layer disposed between the diaphragm 10 and the sensitive membrane 20. The intermediate layer 30 is circular in a top view in this embodiment. As a result of the stress sensor 1 including the intermediate layer 30, when the substance to be detected is adsorbed by the sensitive membrane 20, a region (hereafter also referred to as "contact region") of the diaphragm 10 in contact with the outer edges 31 of the intermediate layer 30 is subjected to a greater stress than in the case where the stress sensor 1 does not include the intermediate layer 30. This principle will be described in detail later. Examples of the material of the intermediate layer 30 include metal materials such as gold, aluminum, silver, tin, magnesium, and alloys thereof, glass materials such as soda glass, and alkali halides such as lithium fluoride.

The contact region includes the vicinity of the region of the diaphragm 10 in contact with the outer edges 31 of the intermediate layer 30. The vicinity of the region of the diaphragm 10 in contact with the outer edges 31 of the intermediate layer 30 includes a range within a predetermined distance from the outer edges 31 in a top view. Thus, the contact region has a circular ring shape in this embodiment, such as the region D in FIG. 3. When the substance to be detected is adsorbed by the sensitive membrane 20, the change in stress in the contact region D is greater than in the other regions, due to the deformation of the diaphragm 10 caused by the presence of the intermediate layer 30.

The intermediate layer 30 is approximately equal to or smaller than the diaphragm 10. The diameter of the intermediate layer 30 is, for example, 100 μm or more and 1000 μm or less. The contact region is, for example, a range of ±20 μm or less from the outer edges 31 of the intermediate layer 30.

The intermediate layer 30 is made of a material whose Young's modulus is intermediate between the Young's modulus of the diaphragm 10 and the Young's modulus of the sensitive membrane 20. In this embodiment, the Young's modulus of the diaphragm 10 is higher than the Young's modulus of the sensitive membrane 20. Accordingly, the Young's modulus of the material of the intermediate layer 30 is lower than the Young's modulus of the diaphragm 10 and higher than the Young's modulus of the sensitive membrane 20.

The Young's modulus of the diaphragm 10 is, for example, 100 GPa or more and 120 GPa or less. The Young's modulus of the sensitive membrane 20 is, for example, 0.1 GPa or more and 10 GPa or less. The Young's modulus of the intermediate layer 30 is, for example, 5 GPa or more and 100 GPa or less.

The intermediate layer 30 may be circular. The diameter of the intermediate layer 30 may be not less than the diameter of the sensitive membrane 20. Consequently, when the substance to be detected is adsorbed by the sensitive membrane 20, the contact region D of the diaphragm 10 is subjected to an even greater stress.

The thickness of the intermediate layer 30 may be less (thinner) than the thickness of the sensitive membrane 20. The thinner the intermediate layer 30, the easier it is to process during manufacture, so that the outer edges 31 can be formed into a desired shape. The thickness of the sensitive membrane 20 is, for example, 1 μm or more and 20 μm or less. The thickness of the intermediate layer 30 is, for example, 0.1 μm or more and 2 μm or less.

The piezoresistive elements 40 to 43 change in resistance in response to the stress applied thereto. For example, the piezoresistive elements 40 to 43 are p-type Si. In the case where the diaphragm 10 is n-type Si, the piezoresistive elements 40 to 43 may be formed by diffusing boron (B). The piezoresistive elements 40 to 43 are disposed on the diaphragm 10. The expression "disposed on the diaphragm 10" herein includes a state of being disposed on the upper surface of the flat diaphragm 10 and a state of being embedded in the diaphragm 10 on the upper surface side of the diaphragm 10 as illustrated in FIG. 2. The piezoresistive elements 40 to 43 are located in the contact region D on the diaphragm 10. In this embodiment, the four piezoresistive elements 40 to 43 are evenly spaced along the outer edges 31 of the intermediate layer 30 in a top view, as illustrated in FIG. 1.

The piezoresistive elements 40 to 43 form a Wheatstone bridge circuit. The stress sensor 1 detects, as electrical signals, changes in resistance of the piezoresistive elements 40 to 43 from the Wheatstone bridge circuit formed by the piezoresistive elements 40 to 43, with it being possible to detect the adsorption of the substance to be detected by the sensitive membrane 20. The Wheatstone bridge circuit need not necessarily be formed using all of the four piezoresistive elements 40 to 43, and may be formed using one, two, or three of the piezoresistive elements 40 to 43. In the case where the Wheatstone bridge circuit is formed using one, two, or three of the piezoresistive elements 40 to 43, the stress sensor 1 may have, on the diaphragm 10, the number of piezoresistive elements used for the Wheatstone bridge circuit.

The piezoresistive elements 40 to 43 are located in the contact region D. The portion of the piezoresistive elements 40 to 43 located outside of the intermediate layer 30 may be larger than the portion of the piezoresistive elements 40 to 43 located inside of the intermediate layer 30. This improves the detection accuracy of the stress sensor 1. The piezoresistive elements 40 to 43 may be, for example, strip-shaped. Although the piezoresistive elements 40 to 43 are located on the upper surface side of the diaphragm 10 in FIGS. 1 and 2, the piezoresistive elements 40 to 43 may be located inside of or on the lower surface side of the diaphragm 10.

Although the stress sensor 1 includes the four piezoresistive elements 40 to 43 in this embodiment, the number of piezoresistive elements included in the stress sensor 1 is not limited to four. The stress sensor 1 includes any number of piezoresistive elements capable of detecting the substance to be detected.

As the detectors for detecting the stress applied to the diaphragm 10, other piezoelectric elements may be used instead of piezoresistive elements.

Figure 4:
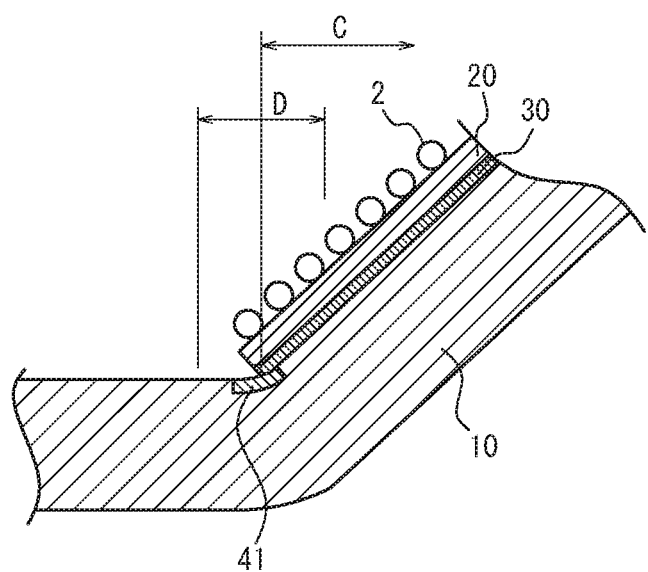
FIG. 4 is an enlarged view of a range A in FIG. 2 when gas molecules are adsorbed by a sensitive membrane.
Figure 4:
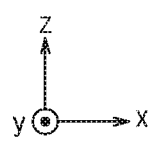

The stress applied to the diaphragm 10 is described below, with reference to FIG. 4. FIG. 4 is an enlarged view of a range A in FIG. 2 when gas molecules 2 are adsorbed by the sensitive membrane 20. The gas molecules 2 schematically represent gas molecules to be detected using the stress sensor 1.

As illustrated in FIG. 4, when the gas molecules 2 are adsorbed by the sensitive membrane 20, the sensitive membrane 20 deforms. With the deformation of the sensitive membrane 20, the intermediate layer 30 deforms, and further the region of the diaphragm 10 on which the intermediate layer 30 is disposed deforms. The deformation of the diaphragm 10 exerts stress to the contact region D.

Specifically, a region C of the diaphragm 10 on which the intermediate layer 30 is disposed deforms in a convex shape in which a central portion of the circular sensitive membrane 20 rises upward. As a result, the contact region D of the diaphragm 10 in this embodiment is subjected to stress caused by the deformation through the intermediate layer 30. Since the Young's modulus of the intermediate layer 30 is higher than the Young's modulus of the sensitive membrane 20, the stress applied to the contact region D of the diaphragm 10 is higher than in the case where the sensitive membrane 20 is placed directly on the diaphragm 10 without the intermediate layer 30 therebetween. In other words, in the case where the sensitive membrane 20 is placed directly on the diaphragm 10, because the Young's modulus of the sensitive membrane 20 is lower than the Young's modulus of the intermediate layer 30, the diaphragm 10 deforms in a gentler curve. The contact region D of the diaphragm 10 in this embodiment, on the other hand, is subjected to a force of deformation through the intermediate layer 30 whose Young's modulus is higher than that of the sensitive membrane 20, and therefore undergoes a greater deformation. This increases the stress applied to the contact region D of the diaphragm 10 in this embodiment.

As described above, in the stress sensor 1 according to this embodiment, the stress applied to the contact region D is higher than in the case where the intermediate layer 30 is not placed on the diaphragm 10. Hence, the piezoresistive elements 40 to 43 located in the contact region D have greater changes in resistance. This contributes to improved detection capability of the stress sensor 1 in detecting the stress applied to the diaphragm 10 when the substance to be detected is adsorbed by the sensitive membrane 20. The stress sensor 1 thus has improved detection capability for the substance to be detected. The stress sensor 1 therefore has improved detection capability.

(Process of Manufacturing Stress Sensor According to this Embodiment)

An example of a process for manufacturing the stress sensor according to this embodiment is described below, with reference to FIGS. 5 to 11. In FIGS. 5 to 11, the same components are given the same reference signs.

(1) Preparation of SOI Substrate

Figure 5:
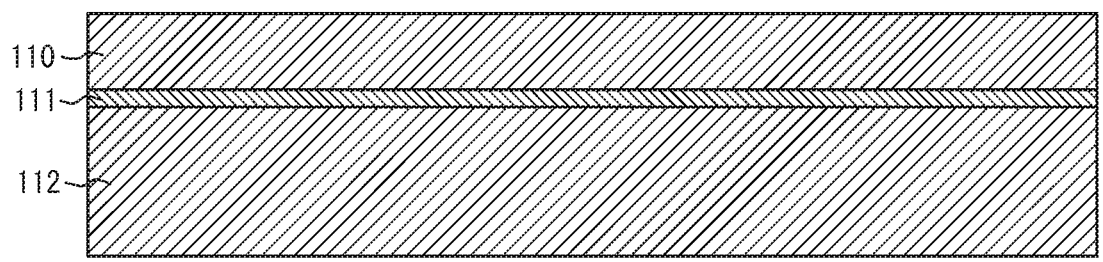
FIG. 5 is a sectional view illustrating the schematic structure of an SOI substrate used in the manufacture of the stress sensor according to Embodiment 1.

First, an SOI substrate to be used in the manufacture of the stress sensor is prepared. FIG. 5 illustrates the schematic structure of an SOI substrate to be used in the manufacture of the stress sensor according to this embodiment. As illustrated in FIG. 5, an SOI substrate 100 includes a first substrate 110, an SiO$_2$ layer 111, and a second substrate 112. The first substrate 110 and the second substrate 112 are Si substrates. The first substrate 110 functions as a diaphragm, and is thinner than the second substrate 112. In the SOI substrate 100, the SiO$_2$ layer 111 is disposed on the second substrate 112, and the first substrate 110 is disposed on the SiO$_2$ layer 111. The SOI substrate 100 is produced by, for example, a lamination method. Hereinafter, it is assumed that the first substrate 110 is n-type.

(2) Formation of Diffusion Wires (High-Doped Layer)

Figure 6:
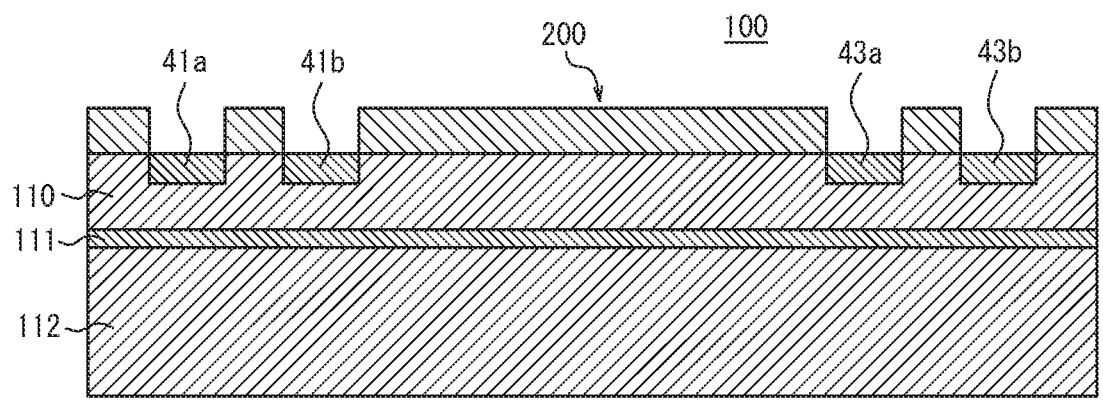
FIG. 6 is a sectional view illustrating a process of manufacturing the stress sensor according to Embodiment 1.

Next, diffusion wires are formed in the SOI substrate 100 illustrated in FIG. 5. As illustrated in FIG. 6, a mask pattern 200 is formed on the first substrate 110, and then a high concentration of boron (B) is injected into the openings of the mask pattern 200 by an ion implantation method, to form diffusion wires 41a, 41b, 43a, and 43b.

(3) Formation of Piezoresistive Elements (Low-Doped Layer)

Figure 7:
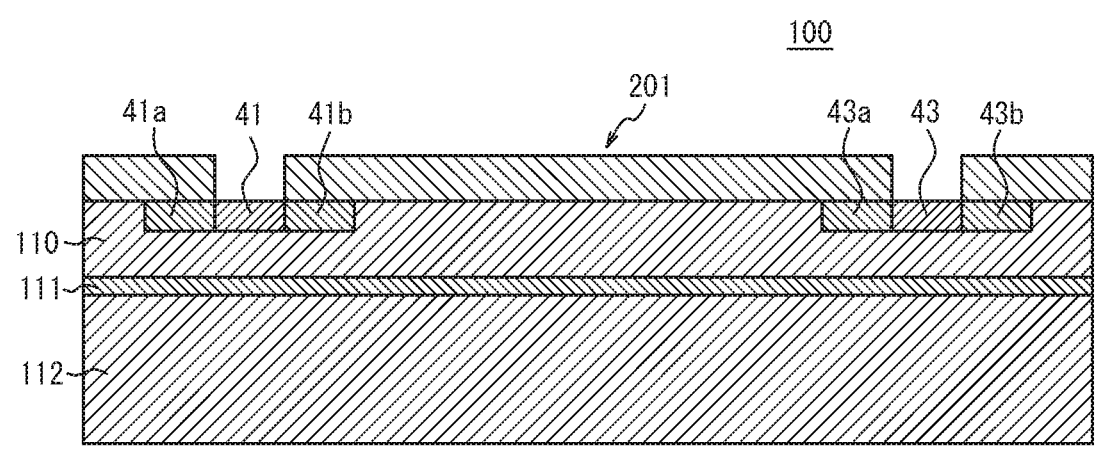
FIG. 7 is a sectional view illustrating the process of manufacturing the stress sensor according to Embodiment 1.

After removing the mask pattern 200 illustrated in FIG. 6, the piezoresistive elements 40 to 43 are formed. As illustrated in FIG. 7, a mask pattern 201 is formed on the first substrate 110, and then a low concentration of boron (B) is injected into the openings of the mask pattern 201 by an ion implantation method, to form the piezoresistive elements 40 to 43.

(4) Formation of Metal Wires

Figure 8A:
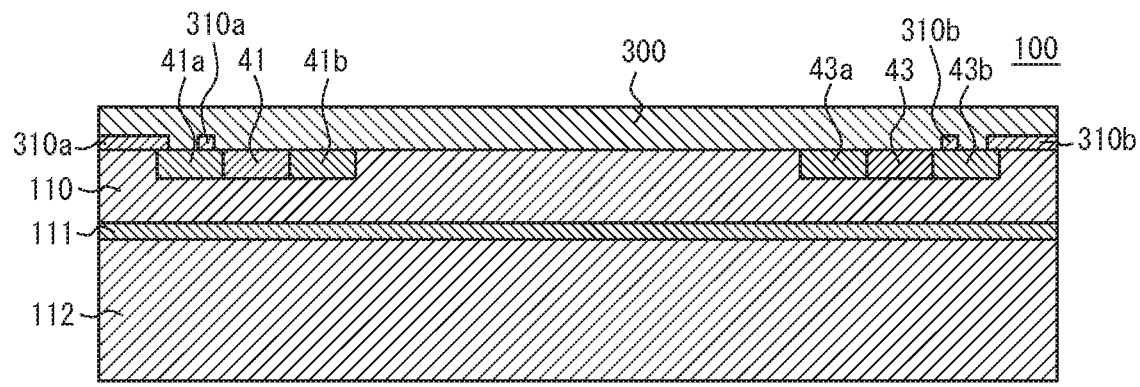
FIG. 8A is a sectional view illustrating the process of manufacturing the stress sensor according to Embodiment 1.
Figure 8B:
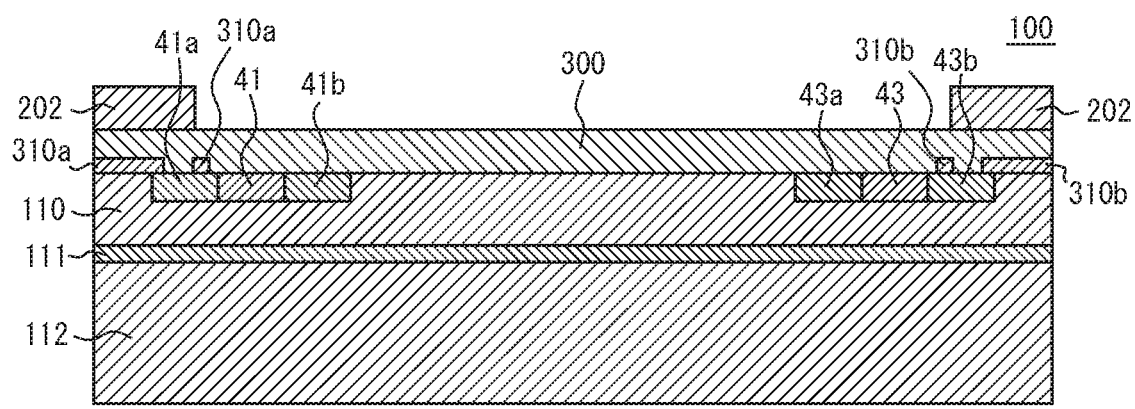
FIG. 8B is a sectional view illustrating the process of manufacturing the stress sensor according to Embodiment 1.
Figure 8C:
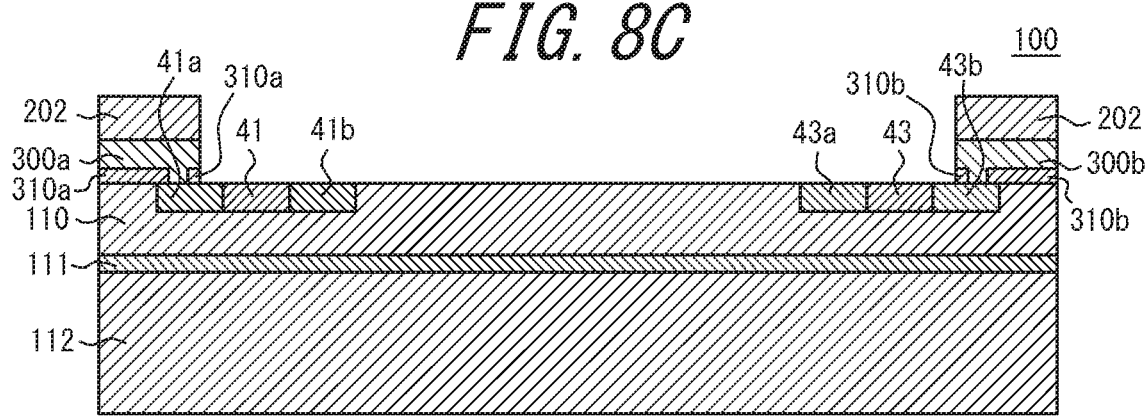
FIG. 8C is a sectional view illustrating the process of manufacturing the stress sensor according to Embodiment 1.

After removing the mask pattern 201 illustrated in FIG. 7 and stacking insulation layers 310a and 310b in a predetermined pattern, metal wires of aluminum or the like are formed. As illustrated in FIG. 8A, a metal (e.g. aluminum) is deposited on the entire surface of the first substrate 110 by sputtering, to form a metal layer 300 (e.g. aluminum layer). Following this, as illustrated in FIG. 8B, a mask pattern 202 is formed on the metal layer 300. Subsequently, as illustrated in FIG. 8C, the metal layer not protected by the mask pattern 202 is etched to form metal wires 300a and 300b. The piezoresistive elements 40 to 43 form a Wheatstone bridge circuit by connection through the metal wires 300a, etc. and the diffusion wires 41a, etc.

(5) Formation of Intermediate Layer

Figure 9:
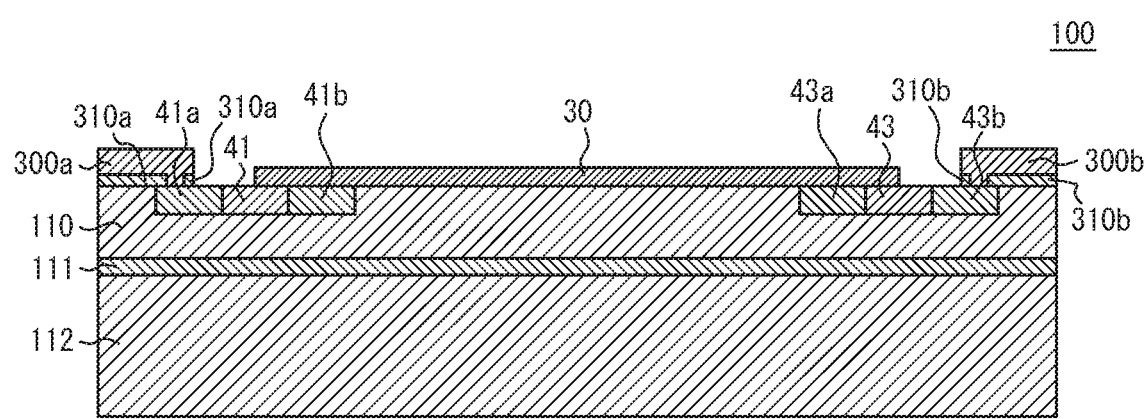
FIG. 9 is a sectional view illustrating the process of manufacturing the stress sensor according to Embodiment 1.

After removing the mask pattern 202 illustrated in FIG. 8C, the intermediate layer is formed. As illustrated in FIG. 9, the intermediate layer 30 is formed by applying a predetermined material onto the first substrate 110. Here, the intermediate layer 30 may be formed in a desired shape by photolithography.

(6) Formation of Diaphragm

Figure 10A:
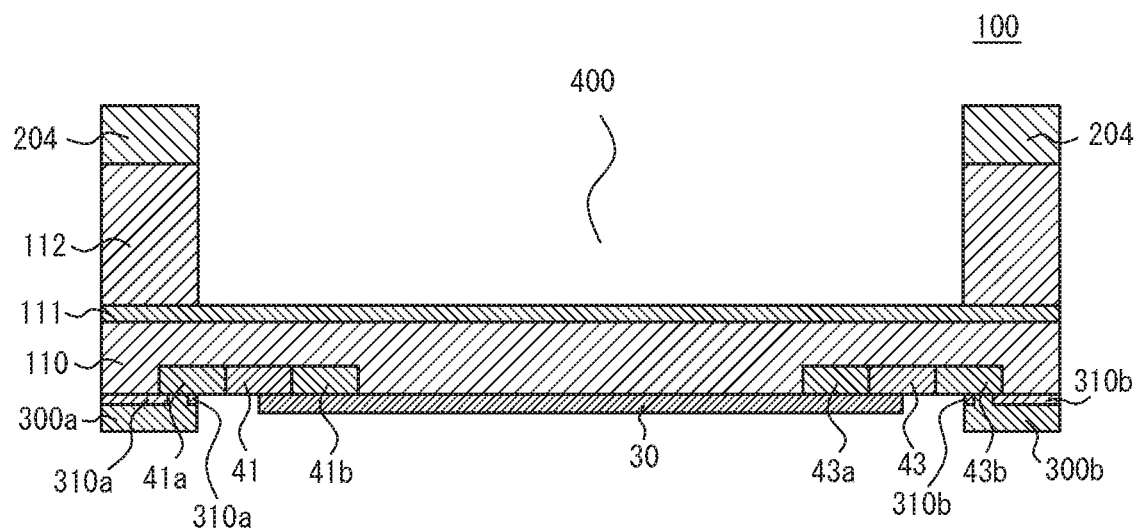
FIG. 10A is a sectional view illustrating the process of manufacturing the stress sensor according to Embodiment 1.

After turning the SOI substrate 100 upside down, the diaphragm is formed. As illustrated in FIG. 10A, a mask pattern 204 is formed on the second substrate 112, and the second substrate 112 not protected by the mask pattern 204 is dry etched to form a depression 400. Here, such dry etching conditions that enable the SiO$_2$ layer 111 to serve as a stop layer are set beforehand. After this, the dry etching conditions are changed, and the SiO$_2$ layer 111 is removed to form the diaphragm as illustrated in FIG. 10B.

(7) Formation of Sensitive Membrane

Figure 10B:
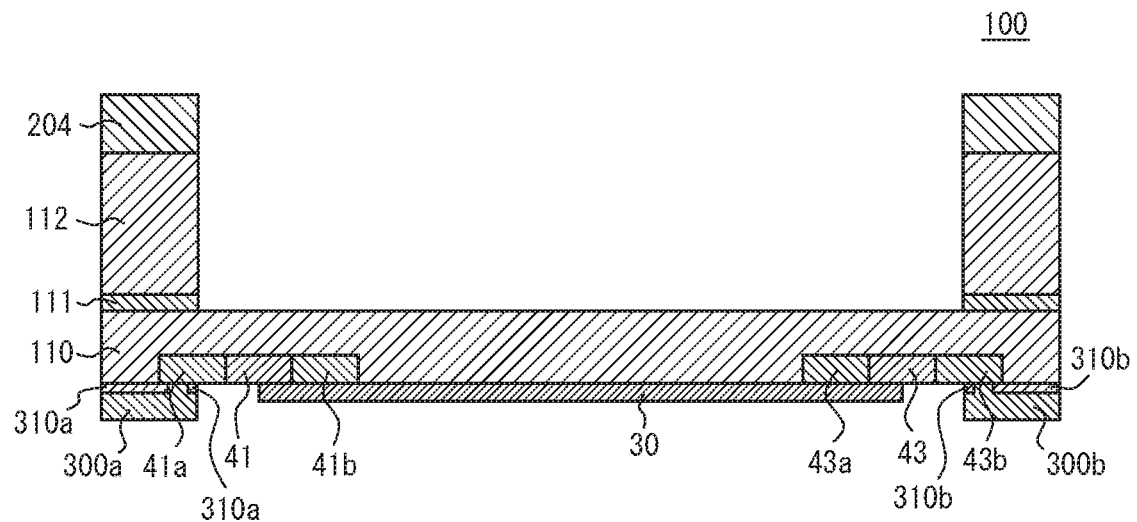
FIG. 10B is a sectional view illustrating the process of manufacturing the stress sensor according to Embodiment 1.
Figure 11:
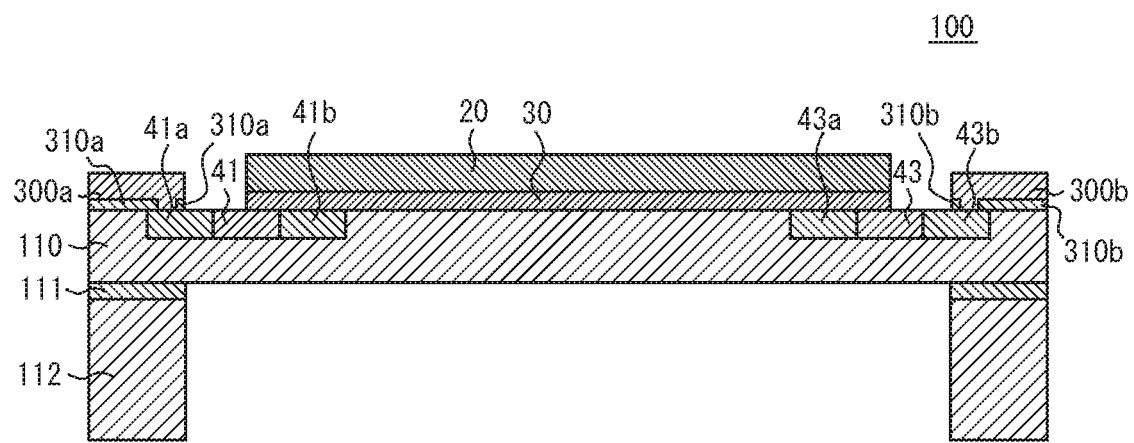
FIG. 11 is a sectional view illustrating the process of manufacturing the stress sensor according to Embodiment 1.

After removing the mask pattern 204 illustrated in FIG. 10B and turning the SOI substrate 100 upside down, the sensitive membrane 20 is formed. As illustrated in FIG. 11, a sensitive membrane material is applied onto the intermediate layer 30 and then dried to form the sensitive membrane 20.

Here, it is assumed that the first substrate 110 is n-type. For example, in the case where the first substrate 110 is p-type, on the other hand, phosphorus (P) is injected instead of boron (B) in the formation of diffusion wires (high-doped layer) in (2) mentioned above and the formation of piezoresistive elements (low-doped layer) in (3) mentioned above.

Embodiment 2

Figure 12:
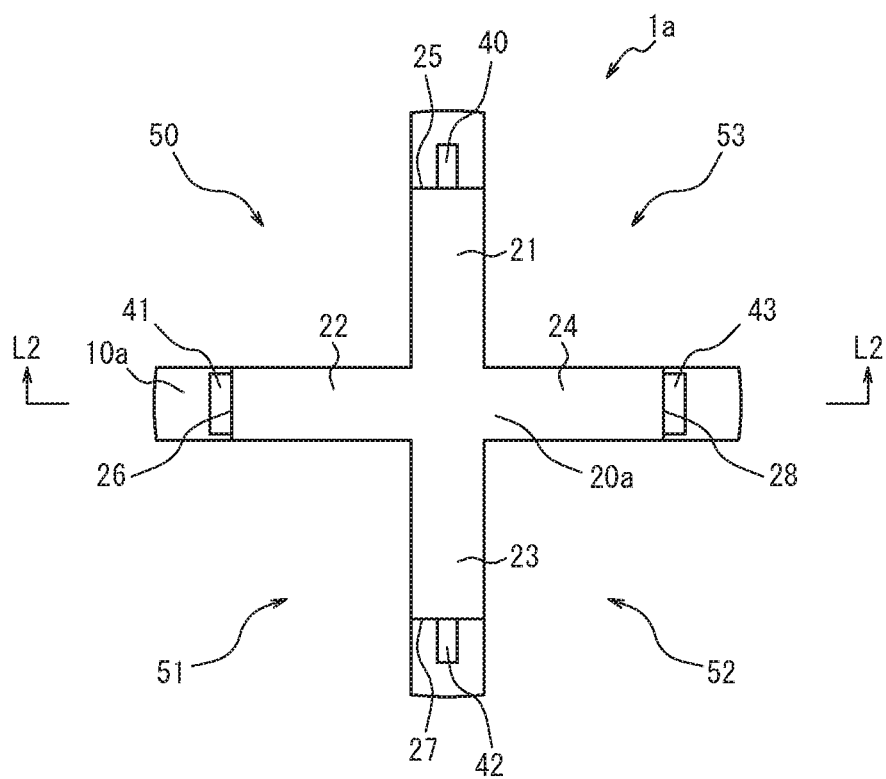
FIG. 12 is a top view illustrating the schematic structure of a stress sensor according to Embodiment 2.

FIG. 12 is a top view illustrating the schematic structure of a stress sensor 1a according to Embodiment 2. In FIG. 12, the same components as those described in Embodiment 1 are given the same reference signs, and their descriptions are omitted as appropriate.

The stress sensor 1a includes a diaphragm 10a having notches 50, 51, 52, and 53 in its outer peripheral portion, a sensitive membrane 20a having notches 50, 51, 52, and 53 in its outer peripheral portion, and the piezoresistive elements 40, 41, 42, and 43. In this embodiment, the sensitive membrane 20a may be disposed on the upper surface of the diaphragm 10a.

In this embodiment, the diaphragm 10a is an Si substrate. The Si substrate is a monocrystalline n-type Si substrate. In FIG. 12, its surface parallel to the xy plane (i.e. surface perpendicular to the z-axis) is an Si(100) surface. In the diaphragm 10a, the x-axis direction is a [110] direction, the y-axis direction is a [1-10] direction, and the z-axis direction is a [001] direction.

In this embodiment, the diaphragm 10a has the four notches 50 to 53 in its outer peripheral portion.

In this embodiment, the sensitive membrane 20a has the four notches 50 to 53 in its outer peripheral portion, four extension portions 21, 22, 23, and 24 separated by the notches 50 to 53, and four outer edge portions 25, 26, 27, and 28 located at the tips of the extension portions 21 to 24. With the notches 50 to 53, the extension portions 21 to 24 are rectangle-shaped and therefore the sensitive membrane 20a is cross-shaped in this embodiment.

In this embodiment, the notches 50 to 53 of the diaphragm 10a and the notches 50 to 53 of the sensitive membrane 20a have the same shape. In detail, the notches 50 to 53 of the diaphragm 10a and the notches 50 to 53 of the sensitive membrane 20a have matching notch lines in a top view, as illustrated in FIG. 12. Alternatively, the notches 50 to 53 of the diaphragm 10a and the notches 50 to 53 of the sensitive membrane 20a may have different shapes. In this embodiment, the notches 50 to 53 are rectangle-shaped in a top view, as illustrated in FIG. 12.

The extension portions 21 to 24 meet each other at their ends. In other words, the sensitive membrane 20a extends in four directions from a central portion of the diaphragm 10a. In the example illustrated in FIG. 12, the respective extension portions 21 to 24 extend in a [−110] direction, a [−1-10] direction, a [1-10] direction, and a [110] direction (hereafter collectively denoted as "<110>") of the diaphragm 10a. The thicknesses of the diaphragm 10a and the sensitive membrane 20a can be selected as appropriate on the basis of the material of the sensitive membrane 20a, the substance to be detected, and the like.

In this embodiment, the piezoresistive elements 40 to 43 are arranged on the diaphragm 10a so as to be located in the <110> directions of the diaphragm 10a. Thus, the longitudinal directions of the piezoresistive elements 40 to 43 correspond to the <110> directions of the diaphragm 10a. A piezoresistance coefficient (a factor of proportionality between the stress applied to a piezoresistive element and the resistance of the piezoresistive element that changes according to the stress) depends on crystal orientation, and is maximum in a <110> direction and minimum in a <100> direction on the Si(100) surface. Accordingly, the piezoresistive elements 40 to 43 are disposed in directions that maximize the piezoresistance coefficient, so as to maximize the change in resistance in accordance with the applied stress. The piezoresistive elements 40 to 43 are located in a stress change region on the diaphragm 10a. The stress change region is described below.

In this embodiment, the stress change region is a region in which, when the substance to be detected is adsorbed by the sensitive membrane 20a, the stress changes greatly with the deformation of the diaphragm 10a. In this embodiment, the notches 50 to 53 are formed to correspond to the <100> directions of the diaphragm 10a. Therefore, when the sensitive membrane 20a deforms, the diaphragm 10a mainly deforms in the <110> directions by the extension portions 21 to 24 of the sensitive membrane 20a. The degree of deformation of the diaphragm 10a is greater in the vicinity of the outer edge portions 25 to 28 located at the tips of the extension portions 21 to 24 of the sensitive membrane 20 separated by the notches 50 to 53. In other words, the stress change region is, for example, a region including the outer edge portions 25 to 28 and the vicinities of the outer edge portions 25 to 28. The vicinities of the outer edge portions 25 to 28 include regions inside and outside of the outer edge portions 25 to 28 with respect to the outer edge portions 25 to 28 in a top view. In this embodiment, the four piezoresistive elements 40 to 43 are disposed with even spacing on the undersides of the outer edge portions 25 to 28 in a top view, as illustrated in FIG. 12.

As long as the piezoresistive elements 40 to 43 are located in the stress change region, the piezoresistive elements 40 to 43 may be disposed inside or outside of the outer edge portions 25 to 28. In terms of stress concentration, the portions of the piezoresistive elements 40 to 43 disposed outside of the outer edge portions 25 to 28 are preferably larger than the portions of the piezoresistive elements 40 to 43 disposed inside of the outer edge portions 25 to 28. Thus, for example, the areas of the planar shapes of the piezoresistive elements 40 to 43 located outside of the outer edge portions 25 to 28 may be larger than the areas of the planar shapes of the piezoresistive elements 40 to 43 located inside of the outer edge portions 25 to 28. Although the piezoresistive elements 40 to 43 are located on the upper surface side of the diaphragm 10a in FIG. 12, the piezoresistive elements 40 to 43 may be located inside of or on the lower surface side of the diaphragm 10a.

In the stress sensor 1a according to this embodiment, when the gas molecules 2 are adsorbed by the sensitive membrane 20a, the sensitive membrane 20a deforms. With the deformation of the sensitive membrane 20a, the region of the diaphragm 10a on which the sensitive membrane 20a is disposed deforms, too. Meanwhile, deformation due to the sensitive membrane 20a is less likely to arise in the region of the diaphragm 10a on which the sensitive membrane 20a is not disposed. The region easily influenced by the sensitive membrane 20a and the region not easily influenced by the sensitive membrane 20a are thus formed outside and inside of the outer edge portion 26.

Specifically, the region easily influenced by the sensitive membrane 20a deforms in a convex shape in which the central side of the sensitive membrane 20a rises upward. The region not easily influenced by the sensitive membrane 20a is hardly affected by the deformation of the sensitive membrane 20a, and so is less deformable and, for example, remains approximately parallel to the xy plane. Here, the diaphragm 10a deforms greatly in a region around the boundary of these regions. In this region near the boundary, the degree of deformation of the diaphragm 10a increases, and the stress applied to the diaphragm 10a increases. Since the piezoresistive elements 40 to 43 are disposed in such a region near the boundary where large stress tends to occur, the deformation of the piezoresistive elements 40 to 43 when the substance to be detected is adsorbed by the sensitive membrane 20a increases. Accordingly, the piezoresistive elements 40 to 43 tend to change greatly in resistance.

As described above, in the stress sensor 1a according to this embodiment, the degree of deformation of the diaphragm 10a in the stress change region when the substance to be detected is adsorbed by the sensitive membrane 20a is greater than in the case where the sensitive membrane 20a does not have the notches 50 to 53. This causes greater stress to be applied to the stress change region. Hence, the piezoresistive elements 50 to 53 located in the stress change region have greater changes in resistance. This contributes to improved detection capability of the stress sensor 1a in detecting the stress applied to the diaphragm 10a when the substance to be detected is adsorbed by the sensitive membrane 20a. The stress sensor 1a thus has improved detection capability for the substance to be detected.

With the stress sensor 1a according to this embodiment, when the substance to be detected is blown on the stress sensor 1a from the upper surface side, the substance not adsorbed by the sensitive membrane 20a passes through the notches 50 to 53. The stress sensor 1a can thus prevent the detection object not adsorbed by the sensitive membrane 20a from remaining on the upper surface of the stress sensor 1a.

In the stress sensor 1a, a second sensitive membrane may be disposed on the lower surface of the diaphragm 10a at which the sensitive membrane 20a is not disposed. Consequently, the substance to be detected that has passed through the notches 50 to 53 can flow to the lower surface side of the diaphragm 10a and be adsorbed by the second sensitive membrane. The degree of deformation of the diaphragm 10a is further increased in the case where the second sensitive membrane has a property of deforming in the opposite direction to that of the sensitive membrane 20a on the upper surface side when adsorbing the substance to be detected.

Embodiment 3

Figure 13:
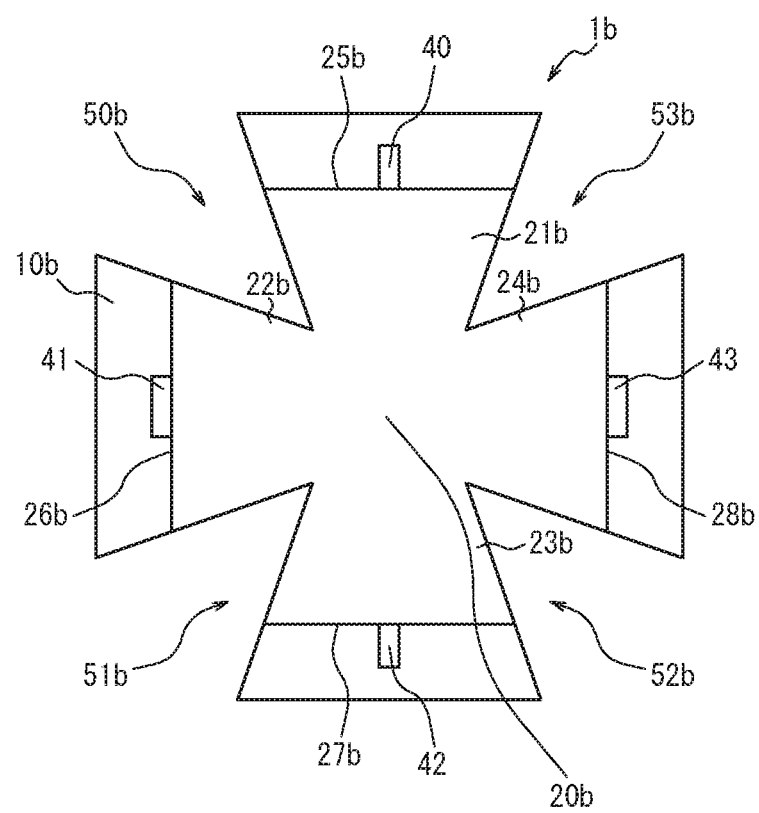
FIG. 13 is a top view illustrating the schematic structure of a stress sensor according to Embodiment 3.

FIG. 13 is a top view illustrating the schematic structure of a stress sensor 1b according to Embodiment 3. In FIG. 13, the same components as those in FIG. 12 are given the same reference signs, and their descriptions are omitted as appropriate.

The stress sensor 1b includes a diaphragm 10b, a sensitive membrane 20b, and the piezoresistive elements 40 to 43. The diaphragm 10b and the sensitive membrane 20b each have four notches 50b, 50b, 52b, and 53b in their outer peripheral portions. In this embodiment, the notches 50b to 53b of the diaphragm 10b and the notches 50b to 53b of the sensitive membrane 20b have the same shape. In detail, the notches 50b to 53b of the diaphragm 10b and the notches 50b to 53b of the sensitive membrane 20b have matching notch lines in a top view, as illustrated in FIG. 13. Alternatively, the notches of the diaphragm 10b and the notches of the sensitive membrane 20b may have different shapes.

The sensitive membrane 20b has four extension portions 21b, 22b, 23b, and 24b separated by the notches 50b to 53b, and four outer edge portions 25b, 26b, 27b, and 28b disposed at the tips of the extension portions 21b to 24b.

In this embodiment, the notches 50b to 53b are wedge-shaped in a top view, as illustrated in FIG. 13. The wedge shape is a shape that decreases in width toward the tip. In this embodiment, the wedge shape is triangular. With the notches 50b to 53b, the extension portions 21b to 24b are respectively shaped to increase in width toward the outer edge portions 25b to 28b in this embodiment.

In the case where the notches 50b to 53b are wedge-shaped, the surface area of the extension portions 21b to 24b of the sensitive membrane 20b disposed to correspond to the <110> directions of the diaphragm 10b increases. Accordingly, the degree of deformation of the diaphragm 10b in the <110> directions when the sensitive membrane 20b deforms is greater. This causes greater stress to be applied to the stress change region.

The other structures and effects of the stress sensor 1b according to this embodiment are the same as those of the stress sensor 1a according to Embodiment 2, and so their descriptions are omitted here.

Embodiment 4

Figure 14:
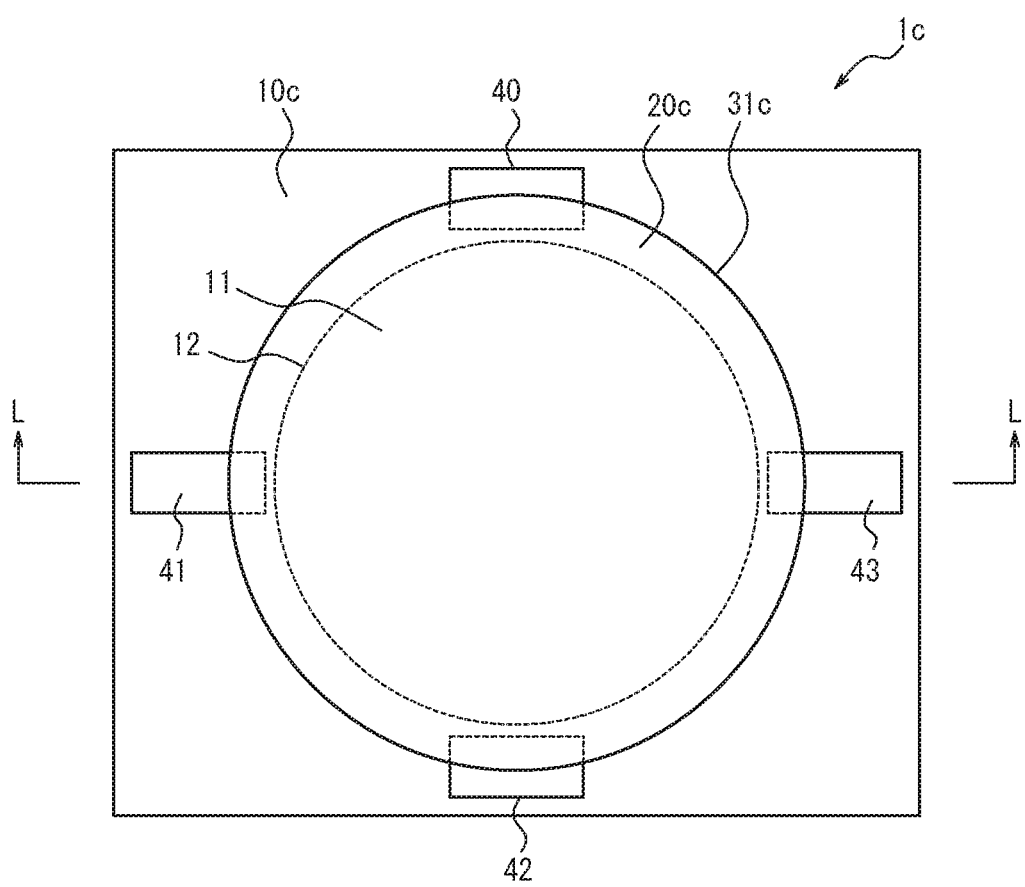
FIG. 14 is a top view illustrating the schematic structure of a stress sensor according to Embodiment 4.
Figure 14:
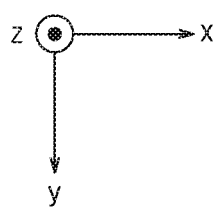

FIG. 14 is a top view illustrating the schematic structure of a stress sensor 1c according to Embodiment 4. In FIG. 14, the same components as those described in Embodiment 1 are given the same reference signs, and their descriptions are omitted as appropriate.

The stress sensor 1c includes a diaphragm 10c having a through region 11, a sensitive membrane 20c, and the four piezoresistive elements (detectors) 40, 41, 42, and 43. In this embodiment, the sensitive membrane 20c is disposed on the upper surface of the diaphragm 10c.

In this embodiment, the diaphragm 10c has, in a part, a through region 11 that passes therethrough in the z direction. In this embodiment, the through region 11 is circular in a top view, as illustrated in FIG. 14. The through region 11 is located in a central portion of the diaphragm 10c.

The sensitive membrane 20c is disposed on the surface of the diaphragm 10c, and covers at least part of the through region 11. Specifically, the sensitive membrane 20c has a region disposed on the surface of the diaphragm 10c and a region covering the through region 11 in a top view. The region of the sensitive membrane 20c disposed on the surface of the diaphragm 10c is a region including the outer edges 31c of the sensitive membrane 20c and a vicinity of the outer edges 31c. The sensitive membrane 20c is disposed on the surface of the diaphragm 10c, outside of and near the edges 12 of the through region 11. The thicknesses of the diaphragm 10c and the sensitive membrane 20c can be selected as appropriate on the basis of the material of the sensitive membrane 20c, the substance to be detected, and the like. The outer edges 31c of the sensitive membrane 20c are similar in shape to the edges 12 of the through region 11 in this embodiment.

In the stress sensor 1c, the stress applied to the region of the diaphragm 10c on which the outer edges 31c of the sensitive membrane 20c are disposed when the substance to be detected is adsorbed by the sensitive membrane 20c increases due to the presence of the through region 11.

The piezoresistive elements 40 to 43 are located in a stress change region on the diaphragm 10c. For example, the stress change region includes the region of the diaphragm 10c on which the outer edges 31c of the sensitive membrane 20c are disposed and a vicinity of the region. The outer edges 31c are disposed near the edges 12 in the diaphragm 10c. In this embodiment, the four piezoresistive elements 40 to 43 are evenly spaced in the region on the diaphragm 10c where the outer edges 31c of the sensitive membrane 20c are disposed in a top view, as illustrated in FIG. 14. The stress change region is, for example, a range of ±20 μm or less from the outer edges 31c of the sensitive membrane 20c.

Although the piezoresistive elements 40 to 43 are located at the outer edges 31c of the sensitive membrane 20c in a top view in the example illustrated in FIG. 14, the piezoresistive elements 40 to 43 may be located along the outer edges 31c of the sensitive membrane 2c inside or outside of the outer edges 31c, as long as the piezoresistive elements 40 to 43 are located in the stress change region.

In the stress sensor 1c according to this embodiment, when the gas molecules 2 are adsorbed by the sensitive membrane 20c, the sensitive membrane 20c deforms. With the deformation of the sensitive membrane 20c, the region of the diaphragm 10c on which the sensitive membrane 20c is disposed deforms, too. Meanwhile, the region of the diaphragm 10c on which the sensitive membrane 20c is not disposed is less deformable by the sensitive membrane 20c. Since the sensitive membrane 20c is disposed with the outer edges 31c as a boundary, the diaphragm 10c has the region easily influenced by deformation and the region not easily influenced by deformation because the sensitive membrane 20c is not provided.

Furthermore, the central region of the sensitive membrane 20c except the vicinity of the outer edges 31c covers the through region 11. In the case where the sensitive membrane 20c is formed on the diaphragm 10c, when the substance is adsorbed by the sensitive membrane 20c, the sensitive membrane 20c deforms but simultaneously an action of hindering the deformation by the diaphragm 10c in contact with the sensitive membrane 20c occurs. In the region of the sensitive membrane 20c covering the through region 11, however, such an action of hindering the deformation does not occur. Therefore, the degree of deformation of the central region of the sensitive membrane 20c covering the through region 11 is greater than in the case where the central region is disposed on the diaphragm 10c.

Specifically, the region of the diaphragm 10c easily influenced by deformation deforms in a convex shape in which the central side of the sensitive membrane 20c rises upward. In particular, the central region has a high degree of deformation as mentioned above, and so the region easily influenced by deformation deforms more greatly as a whole. The region of the diaphragm 10c not easily influenced by deformation is hardly affected by the deformation of the sensitive membrane 20c, and so is less deformable and, for example, remains approximately parallel to the xy plane. Here, the diaphragm 10c deforms greatly in a region around the boundary of the region not easily influenced by deformation and the region easily influenced by deformation. In this region, the degree of deformation of the diaphragm 10c increases, and the stress applied to the diaphragm 10a increases. Since the piezoresistive elements 40 to 43 are disposed in such a region where large stress tends to occur in the stress sensor 1c, the deformation of the piezoresistive elements 40 to 43 when the substance to be detected is adsorbed by the sensitive membrane 20c increases. Accordingly, the piezoresistive elements 40 to 43 tend to change greatly in resistance.

As described above, in the stress sensor 1c according to Embodiment 4, the degree of deformation of the sensitive membrane 20c when the substance to be detected is adsorbed by the sensitive membrane 20c is greater than in the case where the whole sensitive membrane 20c is disposed on the diaphragm 10c, because the sensitive membrane 20c has the region covering the through region 11. The part of the sensitive membrane 20c covering the through region 11 therefore changes greatly, which causes greater stress to be applied to the stress change region. Hence, the piezoresistive elements 40 to 43 located near the outer edges 31c of the sensitive membrane 20c, i.e. the stress change region, have greater changes in resistance. This contributes to improved detection capability of the stress sensor 1c in detecting the stress applied to the diaphragm 10c when the substance to be detected is adsorbed by to the sensitive membrane 20c. The stress sensor 1c thus has improved detection capability for the substance to be detected. The stress sensor 1c therefore has improved detection capability.

Embodiment 5

Figure 15:
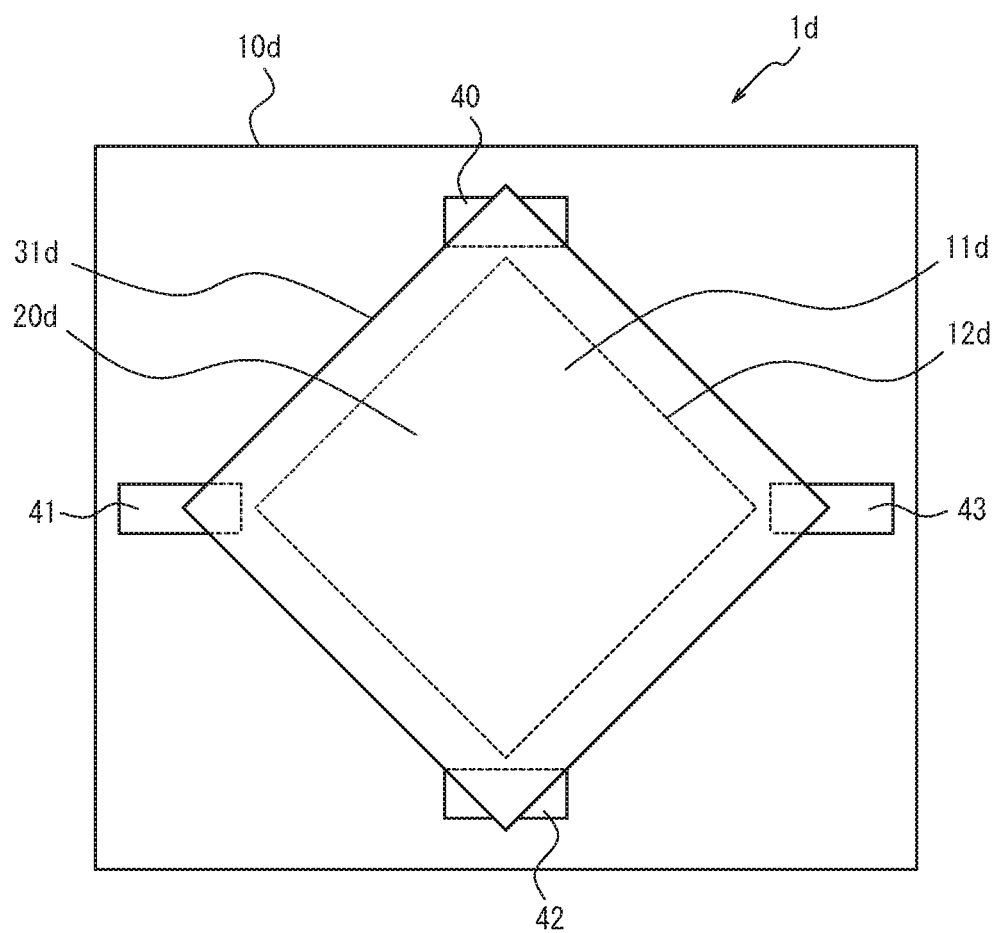
FIG. 15 is a top view illustrating the schematic structure of a stress sensor according to Embodiment 5.

FIG. 15 is a top view illustrating the schematic structure of a stress sensor 1d according to Embodiment 5. In FIG. 15, the same components as those illustrated in FIG. 14 are given the same reference signs, and their descriptions are omitted as appropriate.

The stress sensor 1d includes a diaphragm 10d having a through region 11d, a sensitive membrane 20d, and the piezoresistive elements 40 to 43. The through region 11d and the sensitive membrane 20d are rectangular in a top view, as illustrated in FIG. 15. The outer edges 31d of the sensitive membrane 20d are similar to the edges 12d of the through region 11d. The piezoresistive elements 40 to 43 are disposed in the stress change region, as in the stress sensor 1c in Embodiment 4.

Such a stress sensor 1d can achieve the same effects as the stress sensor 1c according to Embodiment 4. The through region 11d and the sensitive membrane 20d may have any shape besides a circle or a rectangle.

In this embodiment, the piezoresistive elements 40 to 43 may be located in corner regions of the outer edges 21d of the sensitive membrane 20d.

Embodiment 6

Figure 16:
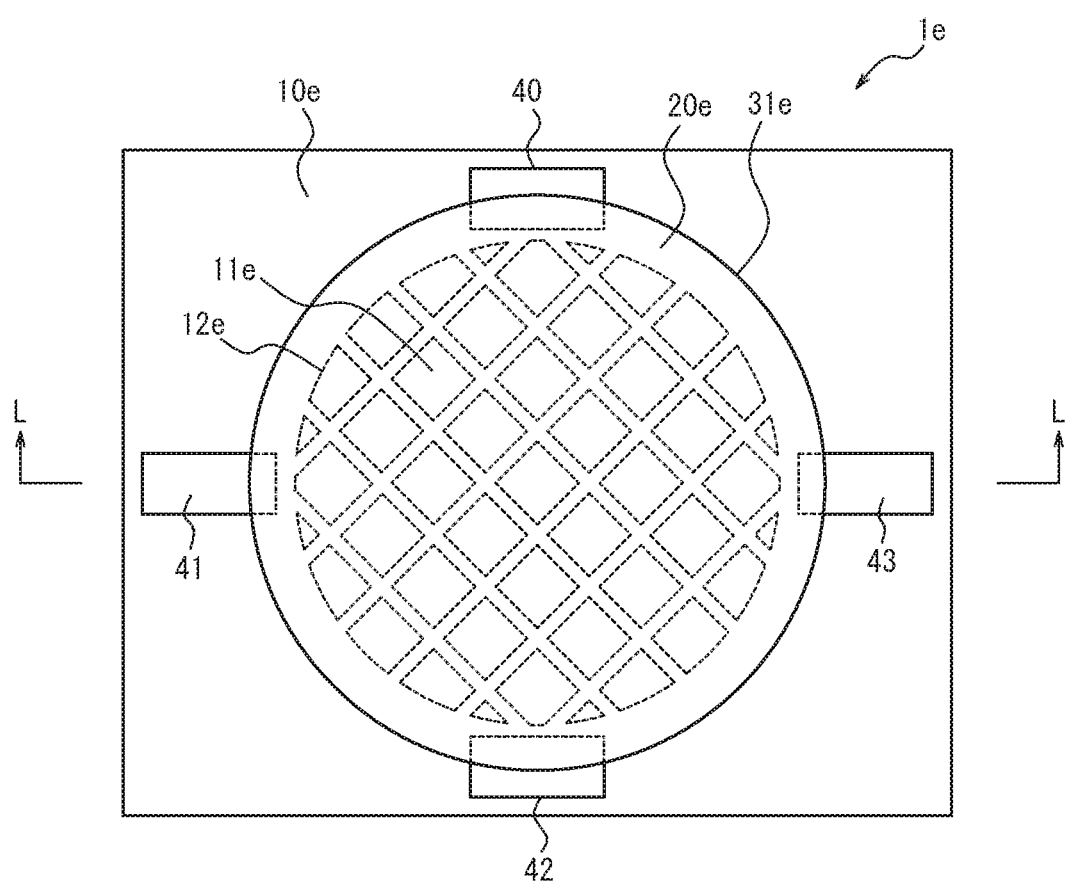
FIG. 16 is a top view illustrating the schematic structure of a stress sensor according to Embodiment 6.

FIG. 16 is a top view illustrating the schematic structure of a stress sensor 1e according to Embodiment 6. In FIG. 16, the same components as those illustrated in FIG. 14 are given the same reference signs, and their descriptions are omitted as appropriate.

The stress sensor 1e includes a diaphragm 10e having a through region 11e. The outer edges 31e of a sensitive membrane 20e are circular, and are similar to the edges 12e of the through region 11e. In this embodiment, the through region 11e has a plurality of through holes, as illustrated in FIG. 16. In other words, the through region 11e is net-like in a top view. This can improve the strength of the diaphragm 10e.

Embodiment 7

Figure 17:
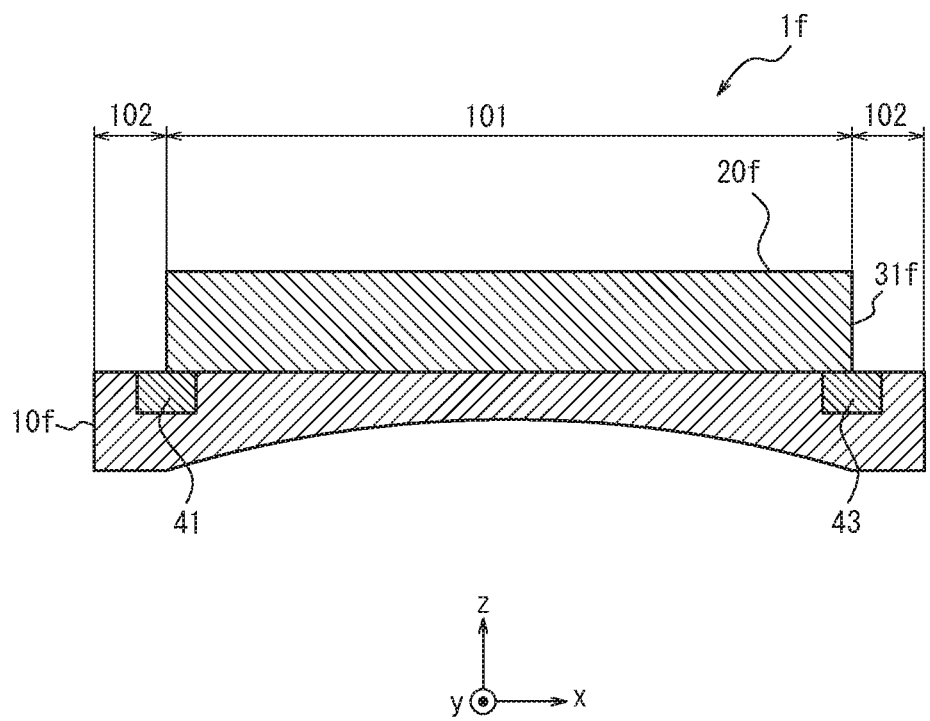
FIG. 17 is a sectional view illustrating the schematic structure of a stress sensor according to Embodiment 7.

FIG. 17 is a sectional view illustrating the schematic structure of a stress sensor 1f according to Embodiment 7. In FIG. 17, the same components as those described in Embodiment 1 are given the same reference signs, and their descriptions are omitted as appropriate.

The stress sensor 1f includes a diaphragm 10f, a sensitive membrane 20f, and four piezoresistive elements. The sensitive membrane 20f may be circular in a top view. In this embodiment, the sensitive membrane 20f is disposed on the upper surface of the diaphragm 10f. The four piezoresistive elements may be evenly spaced along the circumference of the sensitive membrane 20f in a top view. Two piezoresistive elements 41 and 43 out of the four piezoresistive elements are illustrated in FIG. 17.

The sensitive membrane 20f is disposed on the upper surface of the diaphragm 10f. The length (hereafter referred to as "thickness") of the diaphragm 10f in the z-axis direction is not uniform. Specifically, the diaphragm 10f has a first region 101 including the center of the diaphragm 10f, and a second region 102 surrounding the first region 101. The first region 101 is a region in which the diaphragm 10f is thinner than in the second region 102. In the following description of this embodiment, the first region 101 of the diaphragm 10*f* is also referred to as "central region" and the second region 102 of the diaphragm 10*f* as "outer edge region", as an example.

The sensitive membrane 20*f* covers the central region of the diaphragm 10*f* in a top view. Specifically, a central portion of the sensitive membrane 20*f* including the center of the sensitive membrane 20*f* and a portion near the center is disposed on a central portion of the central region of the diaphragm 10*f*, and outer edges 31*f* of the sensitive membrane 20*f* and a portion near the outer edges 31*f* are disposed on an outer edge portion of the central region. The thicknesses of the sensitive membrane 20*f* can be selected as appropriate on the basis of the material of the sensitive membrane 20*f*, the substance to be detected, and the like. The outer edges 31*f* of the sensitive membrane 20 may be located on the outer edge region.

The four piezoresistive elements are located in a stress change region on the diaphragm 10*f*. In this embodiment, the four piezoresistive elements are evenly spaced along the region on the diaphragm 10*f* where the outer edges 31*f* of the sensitive membrane 20*f* are disposed in a top view. The piezoresistive elements may be located along the outer edges 31*f* of the sensitive membrane 20*f* inside or outside of the outer edges 31*f*.

In the stress sensor 1*f* according to this embodiment, when the gas molecules 2 are adsorbed by the sensitive membrane 20*f*, the sensitive membrane 20*f* deforms. With the deformation of the sensitive membrane 20*f*, the region of the diaphragm 10*f* on which the sensitive membrane 20*f* is disposed deforms, too. Meanwhile, the region of the diaphragm 10*f* on which the sensitive membrane 20*f* is not disposed is less deformable by the sensitive membrane 20*f*. Since the sensitive membrane 20*f* is disposed with the outer edges 31*f* as a boundary, the diaphragm 10*f* has the region easily influenced by deformation and the region not easily influenced by deformation because the sensitive membrane 20 is not provided.

Furthermore, the central portion except the vicinity of the outer edges 31*f* of the sensitive membrane 20*f* is disposed on the thin region of the diaphragm 10*f*. In the case where the sensitive membrane 20*f* is formed on the thick region of the diaphragm 10*f*, when the gas molecules 2 are adsorbed by the sensitive membrane 20*f*, the sensitive membrane 20*f* deforms but simultaneously the deformation is hindered by the thick diaphragm 10*f* under the sensitive membrane 20*f*. In the case where the sensitive membrane 20*f* covers the thin region of the diaphragm 10*f* like the central portion of the sensitive membrane 20*f* in this embodiment, on the other hand, the deformation of the sensitive membrane 20*f* is unlikely to be hindered. Therefore, the degree of deformation of the central portion of the sensitive membrane 20*f* disposed on the thin region of the diaphragm 10*f* is greater than in the case where the central portion is disposed on the thick region.

Specifically, the region of the diaphragm 10 easily influenced by deformation deforms in a convex shape in which the central side of the sensitive membrane 20*f* rises upward. In particular, the thin region of the diaphragm 10*f* has a high degree of deformation as mentioned above, and so the region easily influenced by deformation tends to deform more greatly as a whole. The region of the diaphragm 10*f* not easily influenced by deformation is hardly affected by the deformation of the sensitive membrane 20*f*, and so is less deformable and, for example, remains approximately parallel to the xy plane. Here, the diaphragm 10*f* deforms greatly in a region around the boundary of the region easily influenced by deformation and the region not easily influenced by deformation. In this region around the boundary, the degree of deformation of the diaphragm 10*f* increases, and the stress applied to the part increases. Since the piezoresistive elements are disposed in such a region where large stress tends to occur, the deformation of the piezoresistive elements when the substance to be detected is adsorbed by the sensitive membrane 20*f* increases. Accordingly, the piezoresistive elements tend to change greatly in resistance.

As described above, in the stress sensor 1*f* according to Embodiment 7, the degree of deformation of the sensitive membrane 20*f* when the substance to be detected is adsorbed by the sensitive membrane 20*f* is greater than in the case where the sensitive membrane 20*f* is formed on the uniformly thick diaphragm 10*f*, because the sensitive membrane 20*f* covers the thin region of the diaphragm 10*f*. The part of the sensitive membrane 20*f* covering the thin region therefore changes greatly, which causes greater stress to be applied to the stress change region. Hence, the piezoresistive elements located near the outer edges 31*f* of the sensitive membrane 20*f*, i.e. the stress change region, have greater changes in resistance. This contributes to improved detection capability of the stress sensor 1*f* in detecting the stress applied to the diaphragm 10*f* when the substance to be detected is adsorbed by the sensitive membrane 20*f*. The stress sensor 1*f* thus has improved detection capability for the substance to be detected. The stress sensor 1*f* therefore has improved detection capability.

In this embodiment, the thick outer edge region of the diaphragm 10 enhances the strength of the diaphragm 10*f*, with it being possible to improve the yield in the manufacture of the stress sensor 1*f*.

In the first region 101 of the diaphragm 10*f* in this embodiment, the central portion is thinner than the outer edge portion. Moreover, the first region 101 of the diaphragm 10*f* in this embodiment decreases in thickness from the outer edge portion toward the central portion. The upper surface of the first region 101 of the diaphragm 10*f* in this embodiment is planar, and the lower surface of the first region 101 is curved. The shape of the first region 101 in this embodiment may be similar to the shape of the sensitive membrane 20*f*.

The outer edges 31*f* of the sensitive membrane 20*f* may be disposed in the first region 101. This improves the degree of deformation of the diaphragm 10*f*. The piezoresistive elements may be disposed in the first region 101.

The first region 101 may have a thinner region than the sensitive membrane 20*f*. This improves the degree of deformation of the diaphragm 10*f* depending on the deformation of the sensitive membrane 20*f*. The second region 102 may have a thicker region than the sensitive membrane 20*f*. This improves the strength of the diaphragm 10*f*.

Embodiment 8

Figure 18:
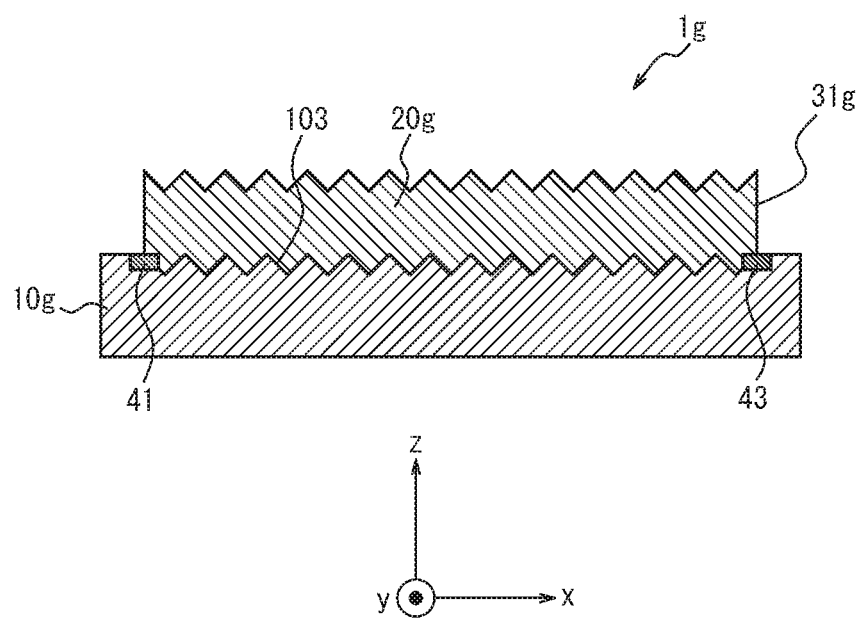
FIG. 18 is a sectional view illustrating the schematic structure of a stress sensor according to Embodiment 8.

FIG. 18 is a sectional view illustrating the schematic structure of a stress sensor 1*g* according to Embodiment 8. In FIG. 18, the same components as those described in Embodiment 1 are given the same reference signs, and their descriptions are omitted as appropriate.

The stress sensor 1*g* includes a diaphragm 10*g*, a sensitive membrane 20*g*, and four piezoresistive elements. The sensitive membrane 20*g* may be circular in a top view. In this embodiment, the sensitive membrane 20*g* is disposed on the upper surface of the diaphragm 10*g*. The four piezoresistive elements may be evenly spaced along the circumference of the sensitive membrane 20*g* in a top view. Two piezoresistive elements 41 and 43 out of the four piezoresistive elements are illustrated in FIG. 18.

Figure 3:
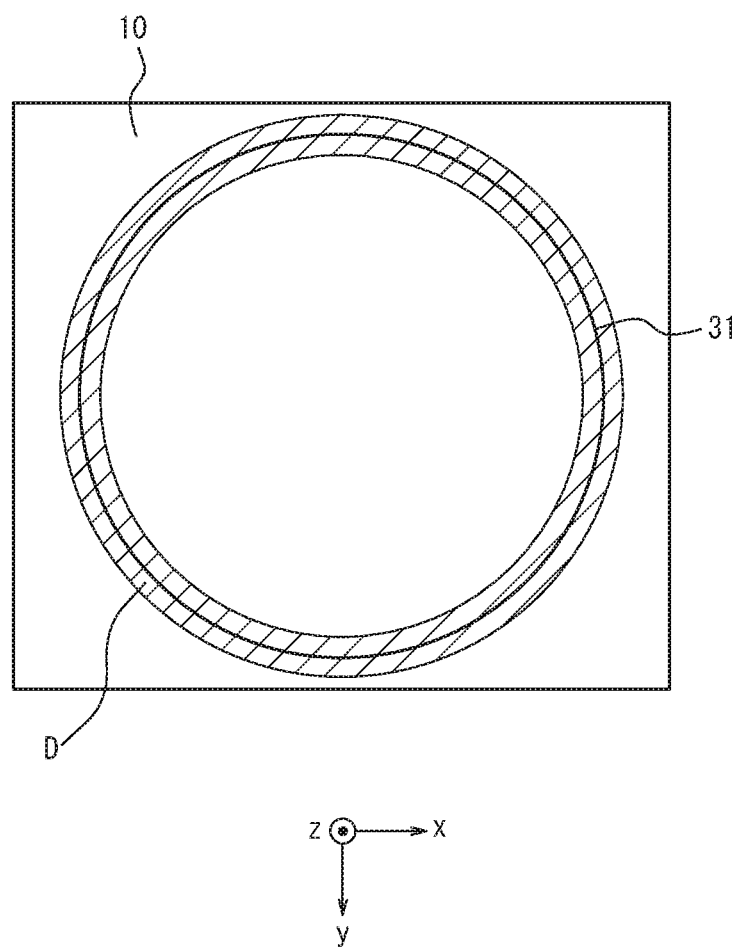
FIG. 3 is a view illustrating an example of a contact region of a diaphragm in Embodiment 1.

As illustrated in FIG. 18, at least the surface (hereafter referred to as "upper surface") of the sensitive membrane 20g not in contact with the diaphragm 10g has a concave-convex shape. The surface of the sensitive membrane 20g in contact with the diaphragm 10g may have a concave-convex shape, too. In this embodiment, both the upper surface and the lower surface of the sensitive membrane 20g have a concave-convex shape. For example, the concave-convex shape may be formed by arranging conical portions. The concave-convex shape may be formed by alternating depressions and projections concentrically, as illustrated in FIG. 3. With such a concave-convex shape, the surface area of the upper surface of the sensitive membrane 20g is larger than the surface area of the upper surface in the case where the sensitive membrane 20g is flat. In the concave-convex shape of the upper surface of the sensitive membrane 20g, the depressions are larger than the molecules and the like adsorbed by the sensitive membrane 20g. The shape of the upper surface of the sensitive membrane 20g is not limited to the above example, and may be any shape that provides a larger surface area than in the case where the upper surface of the sensitive membrane 20g is flat. The concave-convex shape of the upper surface is not limited to a regularly arranged shape.

The four piezoresistive elements are located in a stress change region on the diaphragm 10g. In this embodiment, the four piezoresistive elements are evenly spaced along the region on the diaphragm 10g where the outer edges 31g are disposed in a top view. The piezoresistive elements may be located along the outer edges 31g of the sensitive membrane 20g inside or outside of the outer edges 31g.

In the stress sensor 1g according to this embodiment, when the gas molecules 2 are adsorbed by the sensitive membrane 20g, the sensitive membrane 20g deforms. With the deformation of the sensitive membrane 20g, the region of the diaphragm 10g on which the sensitive membrane 20g is disposed deforms, too. Meanwhile, the region of the diaphragm 10g on which the sensitive membrane 20g is not disposed is less deformable by the sensitive membrane 20g. The region easily influenced by the sensitive membrane 20g and the region not easily influenced by the sensitive membrane 20g are thus formed in an inner region and an outer region with respect to the position in the diaphragm 10g on which the outer edges 31g are disposed.

Specifically, the inner region of the diaphragm 10g deforms in a convex shape in which the central side of the sensitive membrane 20g rises upward. The outer region of the diaphragm 10g is hardly affected by the deformation of the sensitive membrane 20g, and so is less deformable and, for example, remains approximately parallel to the xy plane. Here, the diaphragm 10g deforms greatly in a region around the boundary of these inner and outer regions. In this region near the boundary, the degree of deformation of the diaphragm 10g increases, and the stress applied to the diaphragm 10g increases. Since the piezoresistive elements are disposed in such a region near the boundary where large stress tends to occur, the deformation of the piezoresistive elements when the substance to be detected is adsorbed by the sensitive membrane 20g increases. Accordingly, the piezoresistive elements tend to change greatly in resistance.

Furthermore, the sensitive membrane 20g in this embodiment has a concave-convex-shaped surface, and therefore has a larger surface area than in the case where the sensitive membrane 20g does not have a concave-convex shape. The sensitive membrane 20g having a concave-convex-shaped surface adsorbs a larger number of gas molecules 2. Such a sensitive membrane 20g changes to a greater extent, facilitating changes in resistance of the piezoresistive elements.

As described above, in the stress sensor 1g according to this embodiment, the amount of the substance to be detected that is adsorbed by the sensitive membrane 20g increases, so that the degree of deformation of the diaphragm 10g in the stress change region is greater than in the case where the sensitive membrane 20g does not have a concave-convex-shaped surface. This causes greater stress to be applied to the stress change region. Hence, the piezoresistive elements located near the position where the outer edges 31g of the sensitive membrane 20g are disposed, i.e. the stress change region, have greater changes in resistance. This contributes to improved detection capability of the stress sensor 1g in detecting the stress applied to the diaphragm 10g when the substance to be detected is adsorbed by the sensitive membrane 20g. The stress sensor 1g thus has improved detection capability for the substance to be detected. The stress sensor 1g therefore has improved detection capability.

The upper surface of the diaphragm 10g may have a concave-convex shape, as illustrated in FIG. 18. In other words, the upper surface of the diaphragm 10g may have a third region 103 having a concave-convex shape. This increases the contact area between the diaphragm 10g and the sensitive membrane 20g, and keeps the sensitive membrane 20g from peeling off the diaphragm 10g.

In this embodiment, the surface roughness (Ra) of the diaphragm 10g is higher than the surface roughness (Ra) of the sensitive membrane 20g. The surface roughness (Ra) of the diaphragm 10g is, for example, 1 μm or more and 3 μm or less. The surface roughness (Ra) of the sensitive membrane 20g is, for example, 90% or less of the surface roughness (Ra) of the diaphragm 10g.

The piezoresistive elements may be located outside of the third region 103. Consequently, the piezoresistive elements can be easily kept from disconnection. This ensures the conduction of the piezoresistive elements.

The third region 103 of the diaphragm 10g may be larger than the sensitive membrane 20g. In this case, the outer edges of the third region 103 are located outside of the outer edged 31g of the sensitive membrane 20g. The third region 103 of the diaphragm 10g may be smaller than the sensitive membrane 20g. In this case, the outer edges of the third region 103 are located inside of the outer edged 31g of the sensitive membrane 20g.

Only a central portion of the upper surface of the sensitive membrane 20g may have a concave-convex shape, or the whole upper surface of the sensitive membrane 20g may have a concave-convex shape.

The concave-convex shape of the third region 103 may be a concentric shape similar to the shape of the sensitive membrane 20g. Specifically, the third region 103 may have a plurality of grooves along the outer edges 31g of the sensitive membrane 20g, as depressions. Thus, for example when the outer edges 31g expand by the expansion of the sensitive membrane 20g, the diaphragm 10g is easily subjected to a force by the deformation of the sensitive membrane 20g because the concave-convex shape of the third region 103 is perpendicular to or nearly perpendicular to the expansion direction of the outer edges 31g. This facilitates the deformation of the diaphragm 10g.

Embodiment 9

Figure 19:
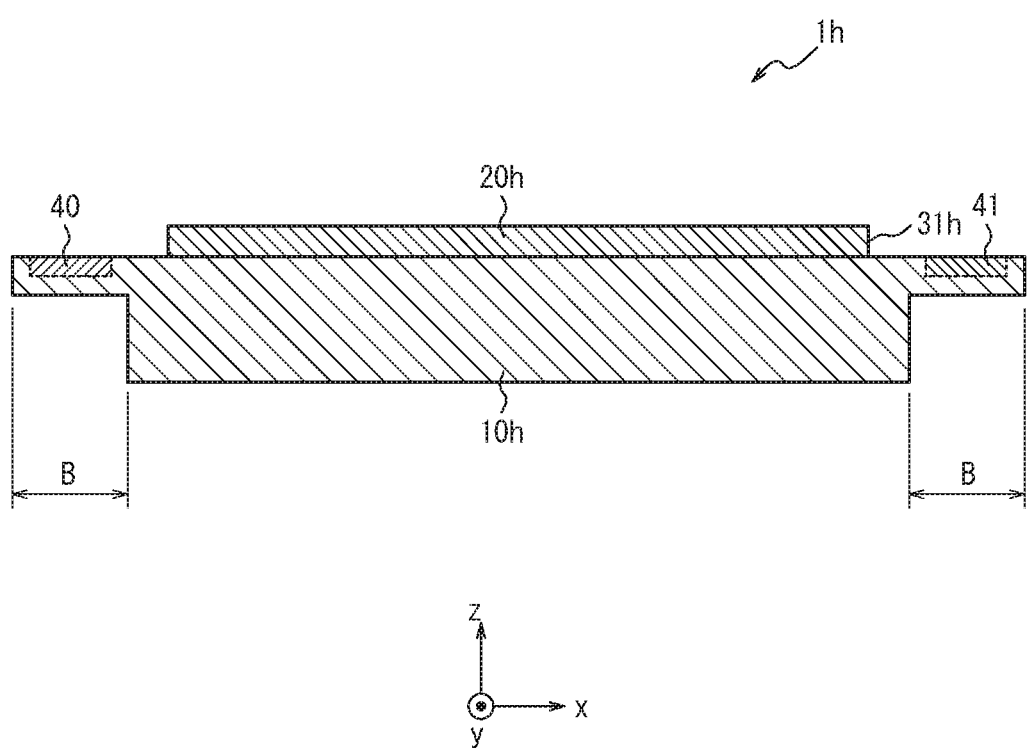
FIG. 19 is a sectional view illustrating the schematic structure of a stress sensor according to Embodiment 9.

FIG. 19 is a sectional view illustrating the schematic structure of a stress sensor 1h according to Embodiment 9.

In FIG. 19, the same components as those described in Embodiment 1 are given the same reference signs, and their descriptions are omitted as appropriate.

The stress sensor 1h includes a diaphragm 10h, a sensitive membrane 20h, and two piezoresistive elements 40 and 41. The sensitive membrane 20h may be circular in a top view. In this embodiment, the sensitive membrane 20h is disposed on the upper surface of the diaphragm 10h. The two piezoresistive elements 40 and 41 are disposed in regions outside of the outer edge portions 31h so as to face each other with the sensitive membrane 20h therebetween, in a top view.

The two piezoresistive elements 40 and 41 are located in a stress change region on the diaphragm 10h. The piezoresistive elements 40 and 41 may be located at the outer edges 31h of the sensitive membrane 20h or inside of the outer edges 31h. The stress sensor 1h may include one piezoresistive element or three or more piezoresistive elements.

In the diaphragm 10h in this embodiment, the thickness of a placement region is less than the thickness of regions other than the placement region. Herein, the placement region includes a region within a predetermined range from the region where the piezoresistive elements 40 and 41 are disposed. In detail, the placement region includes the region where the piezoresistive elements 40 and 41 are disposed and a region within a predetermined range from the region where the piezoresistive elements 40 and 41 are disposed in a top view, such as a region B illustrated in FIG. 19 as an example. The placement region B is included in the stress change region. As a result of the thickness of the placement region B being less than the thickness of the other regions, greater stress is applied to the placement region B than the other regions when the substance to be detected is adsorbed by the sensitive membrane 20h. This principle is described in detail below.

In the stress sensor 1h according to this embodiment, when the gas molecules 2 are adsorbed by the sensitive membrane 20h, the sensitive membrane 20h deforms. With the deformation of the sensitive membrane 20h, the region of the diaphragm 10h on which the sensitive membrane 20h is disposed deforms, too. The deformation of the diaphragm 10h exerts stress to the placement region B.

Specifically, the region of the diaphragm 10h on which the sensitive membrane 20h is disposed deforms in a convex shape in which a central portion of the circular sensitive membrane 20h rises upward. As a result of the deformation of this region, an upward force acts on the region of the diaphragm 10h on which the sensitive membrane 20h is not disposed. Here, the placement region of the diaphragm 10 is thinner than the other regions, and accordingly more deformable than the other regions. In the placement region B, the degree of deformation of the diaphragm 10h increases as compared with the other regions, and the stress applied to the region increases. Since the piezoresistive elements 40 and 41 are disposed in such a placement region B where large stress tends to occur, the deformation of the piezoresistive elements 40 and 41 when the substance to be detected is adsorbed by to the sensitive membrane 20h increases. Accordingly, the piezoresistive elements 40 and 41 tend to change greatly in resistance.

As described above, in the stress sensor 1h according to this embodiment, the degree of deformation of the diaphragm 10h in the placement region B when the substance to be detected is adsorbed by the sensitive membrane 20h is greater than in the other regions. This causes greater stress to be applied to the placement region B. Hence, the piezoresistive elements 40 and 41 disposed in the placement region B have greater changes in resistance. This contributes to improved detection capability of the stress sensor 1h in detecting the stress applied to the diaphragm 10h when the substance to be detected is adsorbed by the sensitive membrane 20h. The stress sensor 1h thus has improved detection capability for the substance to be detected. The stress sensor 1h therefore has improved detection capability.

Embodiment 10

Figure 20:
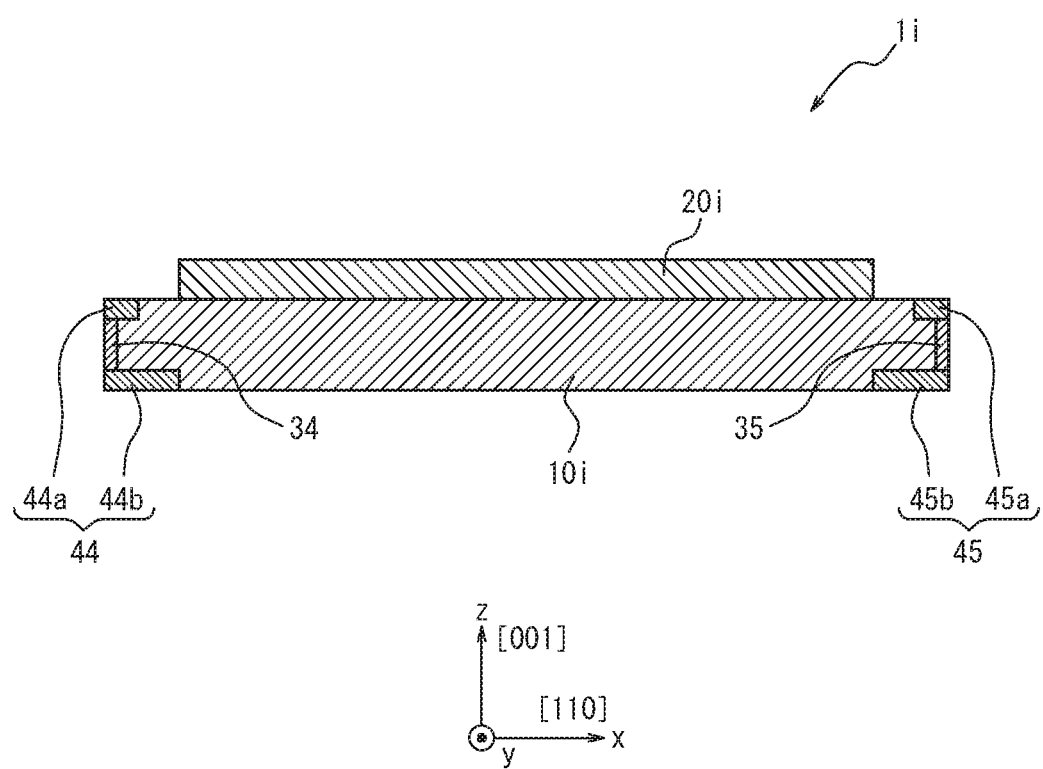
FIG. 20 is a sectional view illustrating the schematic structure of a stress sensor according to Embodiment 10.

FIG. 20 is a sectional view illustrating the schematic structure of a stress sensor 1i according to Embodiment 10. In FIG. 20, the same components as those described in Embodiment 1 are given the same reference signs, and their description are omitted as appropriate.

The stress sensor 1i includes a diaphragm 10i, a sensitive membrane 20i disposed on the upper surface of the diaphragm 10i, a connection portion, a first piezoresistive element (first detector), and a second piezoresistive element (second detector). In this embodiment, the sensitive membrane 20i is disposed on the upper surface of the diaphragm 10i. The first piezoresistive element and the second piezoresistive element are electrically connected by the connection portion in series, to form four resistors. Two resistors 44 and 45 out of the four resistors are illustrated in FIG. 20. The resistor 44 includes a first piezoresistive element 44a, a second piezoresistive element 44b, and a connection portion 34 connecting the first piezoresistive element 44a and the second piezoresistive element 44b. The resistor 45 includes a first piezoresistive element 45a, a second piezoresistive element 45b, and a connection portion 35 connecting the first piezoresistive element 45a and the second piezoresistive element 45b. In this embodiment, the first piezoresistive element and the second piezoresistive element are simply referred to as "piezoresistive elements" when not being distinguished from each other.

The diaphragm 10i in this embodiment is a monocrystalline n-type Si substrate. In FIG. 20, its surface parallel to the xy plane (i.e. surface perpendicular to the z-axis) is an Si(100) surface. In the diaphragm 10i, the x-axis direction is a [110] direction, the y-axis direction is a [1-10] direction, and the z-axis direction is a [001] direction.

Each connection portion is, for example, a via conductor or a diffusion wire, and electrically connects the first piezoresistive element and the second piezoresistive element in series to form a resistor. The resistor 44 formed by connecting the piezoresistive elements 44a and 44b in series by the connection portion 34 and the resistor 45 formed by connecting the piezoresistive elements 45a and 45b in series by the connection portion 35 are illustrated in FIG. 20.

Each piezoresistive element changes in resistance in response to the stress applied thereto. The piezoresistive element is a p-type Si, and is formed by diffusing boron (B) to the diaphragm 10i which is an n-type Si substrate.

The first piezoresistive element is disposed on the diaphragm 10i. The expression "disposed on the diaphragm 10i" in this embodiment includes a state of being disposed on the upper surface of the flat diaphragm 10i and a state of being embedded in the diaphragm 10i on the upper surface side of the diaphragm 10i as illustrated in FIG. 20.

The second piezoresistive element is disposed under the diaphragm 10i. The expression "disposed under the diaphragm 10i" in this embodiment includes a state of being disposed on the lower surface of the flat diaphragm 10i and a state of being embedded in the diaphragm 10i on the lower surface side of the diaphragm 10i as illustrated in FIG. 20.

The longitudinal direction of the first piezoresistive element and the longitudinal direction of the second piezoresistive element may be different from each other. The longitudinal direction of the first piezoresistive element and the longitudinal direction of the second piezoresistive element may be orthogonal to each other. In this embodiment, the longitudinal direction of the first piezoresistive element corresponds to the y-axis direction (first direction), and the longitudinal direction of the second piezoresistive element corresponds to the x-axis direction (second direction).

Current flowing through a piezoresistive element flows in the longitudinal direction of the piezoresistive element. In detail, current flowing through the first piezoresistive element flows in the first direction, and current flowing through the second piezoresistive element flows in the second direction. The first piezoresistive element and the second piezoresistive element partially overlap each other in a top view. The connection portion extends in the vertical direction at the position where the first piezoresistive element and the second piezoresistive element overlap in a top view, and connects the first piezoresistive element and the second piezoresistive element, as illustrated in FIG. 20.

The resistor is formed by electrically connecting the first piezoresistive element and the second piezoresistive element in series. The resistance of the resistor formed in this way is the sum of the resistance of the first piezoresistive element and the resistance of the second piezoresistive element. In this embodiment, the resistor is formed by connecting the first piezoresistive element and the second piezoresistive element each in L shape in a top view.

The four resistors form a Wheatstone bridge circuit. The stress sensor 1$i$ detects, as electrical signals, changes in resistance of the resistors from the Wheatstone bridge circuit formed by the four resistors, with it being possible to detect the adsorption of the substance to be detected by the sensitive membrane 20$i$. The Wheatstone bridge circuit need not necessarily be formed using all of the four resistors, and may be formed using one, two, or three of the resistors. In the case where the Wheatstone bridge circuit is formed using one, two, or three of the resistors, the stress sensor 1$i$ may have, in the diaphragm 10$i$, the number of resistors used for the Wheatstone bridge circuit.

Although the stress sensor 1$i$ includes the four resistors in this embodiment, the number of resistors included in the stress sensor 1$i$ is not limited to four. The stress sensor 1$i$ includes any number of resistors capable of detecting the substance to be detected.

The stress applied to the diaphragm 10$i$ when the substance to be detected is adsorbed by the sensitive membrane 20$i$ is described below. In the stress sensor 1$i$ according to this embodiment, when the gas molecules 2 are adsorbed by the sensitive membrane 20$i$, the sensitive membrane 20 deforms. With this deformation, the diaphragm 10$i$ deforms, too. For example, the upper surface side of the diaphragm 10$i$ expands and the lower surface side of the diaphragm 10$i$ contracts, thus exerting stress to the upper surface side of the diaphragm 10$i$ and the lower surface side of the diaphragm 10$i$ in different directions from each other. In this embodiment, the upper surface side of the diaphragm 10$i$ is subjected to first stress toward the central portion of the diaphragm 10$i$, and the lower surface side of the diaphragm 10$i$ is subjected to second stress toward the peripheral portion of the diaphragm 10$i$. A first stress x-axis component which is the stress component of the first stress in the x-axis direction and a second stress x-axis component which is the stress component of the second stress in the x-axis direction are opposite in direction to each other in the x-axis direction.

The relationship between the stress applied to the diaphragm 10$i$ and the amount of change $\Delta R$ in resistance of a piezoresistive element is described below. In this embodiment, the diaphragm 10$i$ is monocrystalline Si with its surface being Si(100), and the stress applied to the diaphragm 10 can be regarded as plane stress. In this case, the amount of change $\Delta R$ in resistance of the piezoresistive element is proportional to ($\sigma x - \sigma y$), where $\sigma x$ is the stress in the x-axis direction and $\sigma y$ is the stress in the y-axis direction. Accordingly, whether the amount of change $\Delta R$ in resistance of the piezoresistive element is positive or negative depends on the direction of $\sigma x$ which is the stress in the x-axis direction.

In this embodiment, the first stress x-axis component and the second stress x-axis component different in direction from each other are applied to the upper surface side and the lower surface side of the diaphragm 10$i$. Therefore, in the case where the longitudinal directions of the piezoresistive elements disposed in the upper and lower parts of the diaphragm 10$i$ both correspond to the y-axis direction, the amount of change $\Delta R$ in resistance of one of the piezoresistive elements disposed in the upper and lower parts of the diaphragm 10$i$ is positive, and the amount of change $\Delta R$ in resistance of the other one of the piezoresistive elements is negative. In such a case, if the piezoresistive elements disposed in the upper and lower parts of the diaphragm 10$i$ are connected in series to form a series resistor, the amount of change in resistance of the series resistor decreases because the amounts of change $\Delta R$ in resistance of the piezoresistive elements are opposite in positive/negative sign and cancel each other out.

In this embodiment, on the other hand, the longitudinal direction of the first piezoresistive element disposed in the upper part of the diaphragm 10$i$ corresponds to the y-axis direction, and the longitudinal direction of the second piezoresistive element disposed in the lower part of the diaphragm 10$i$ corresponds to the x-axis direction. Hence, even when the first piezoresistive element and the second piezoresistive element are connected in series to form a resistor, the stress in the x-axis direction influencing the resistor is only the first stress x-axis component applied to the first piezoresistive element 41$a$. Moreover, in this embodiment, the resistor can also gain the amount of change in resistance caused by the stress in the y-axis direction of the second piezoresistive element whose longitudinal direction corresponds to the x-axis direction. Thus, the resistor can gain a larger amount of change in resistance by adding the amounts of change in resistance of the first piezoresistive element and the second piezoresistive element together.

As described above, in the stress sensor 1$i$ according to this embodiment, the first piezoresistive element disposed on the diaphragm 10$i$ and the second piezoresistive element disposed under the diaphragm 10$i$ are connected in series to form a resistor. The resistance of such a resistor is the sum of the respective resistances of the first piezoresistive element and the second piezoresistive element. The stress sensor 1$i$ can therefore increase the change in resistance of the resistor when the substance to be detected is adsorbed by the sensitive membrane 20$i$, as compared with the case where the resistor is not formed as a series resistor of piezoresistive elements. The stress sensor 1$i$ thus has improved detection capability for the substance to be detected.

Embodiment 11

Figure 21:
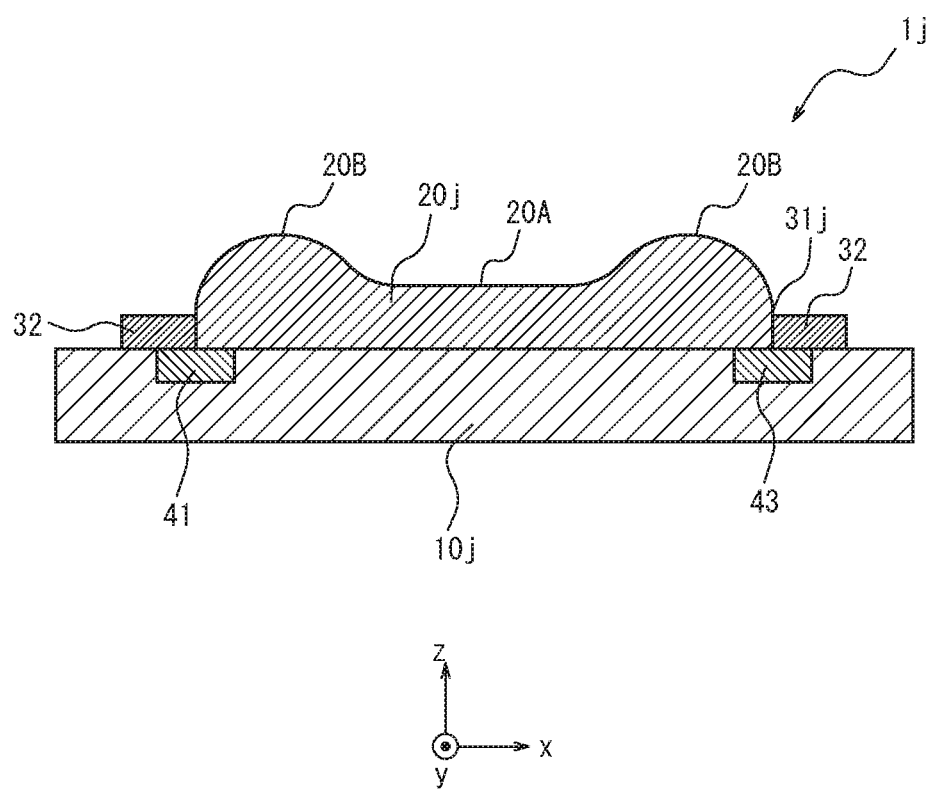
FIG. 21 is a sectional view illustrating the schematic structure of a stress sensor according to Embodiment 11.

FIG. 21 is a sectional view illustrating the schematic structure of a stress sensor 1$j$ according to Embodiment 11. In FIG. 21, the same components as those described in Embodiment 1 are given the same reference signs, and their descriptions are omitted as appropriate.

The stress sensor 1*j* includes a diaphragm 10*j*, a sensitive membrane 20*j*, a projection 32, and four piezoresistive elements. The sensitive membrane 20*j* may be circular in a top view. In this embodiment, the sensitive membrane 20*j* is disposed in a region surrounded by the projection 32 on the upper surface of the diaphragm 10*j*. Two piezoresistive elements 41 and 43 out of the four piezoresistive elements are illustrated in FIG. 21.

The sensitive membrane 20*j* has a central portion 20A and an outer portion 20B thicker than the central portion 20A, as illustrated in FIG. 21. This shape in which the outer portion 20B is thicker than the central portion 20A is obtained, for example, by forming the projection 32 and then applying a sensitive membrane material to the region surrounded by the projection 32 to form the sensitive membrane 20*j*. In this formation of the sensitive membrane 20*j*, when the sensitive membrane material is applied, the spreading sensitive membrane material in liquid state is held back by the projection 32, as a result of which the outer portion 20B rises. The resultant sensitive membrane 20*j* has a shape in which the outer portion 20B is thicker than the central portion 20A. Here, the projection 32 is in contact with the sensitive membrane 20*j*.

The projection 32 is disposed on the upper surface of the diaphragm 10*j*. The projection 32 is, for example, in a ring shape with an approximately rectangular cross section. For example, in the case where the sensitive membrane 20*j* is a hydrophilic material, the projection 32 may be made of a hydrophobic material. Such a projection 32 sheds the sensitive membrane 20*j* in the manufacture of the stress sensor 1*j*, so that the sensitive membrane 20*j* can have steeper outer edges 31*j*. The material of the projection 32 is, for example, SiN. Hydrophilicity means that the chemical species or substituents of the material of the sensitive membrane 20*j* bond with water ($H_2O$) by hydrogen bonding and the like. Hydrophobicity means that the material of the sensitive membrane 20*j* has an opposite polarity to hydrophilicity.

The four piezoresistive elements are located in a stress change region on the diaphragm 10*j*. In this embodiment, the four piezoresistive elements are evenly spaced along the region on the diaphragm 10*j* where the outer edges 31*j* of the sensitive membrane 20*j* are disposed in a top view. The piezoresistive elements may be located along the outer edges 31*j* of the sensitive membrane 20*j* inside or outside of the outer edges 31*j*.

In the stress sensor 1*j* according to this embodiment, when the gas molecules 2 are adsorbed by the sensitive membrane 20*j*, the sensitive membrane 20*j* deforms. With the deformation of the sensitive membrane 20*j*, the region of the diaphragm 10*j* on which the sensitive membrane 20*j* is disposed deforms, too. The deformation of the diaphragm 10*j* exerts stress to the stress change region.

Specifically, the region of the diaphragm 10*j* inside of the projection 32 in a top view deforms in a convex shape in which the central side of the sensitive membrane 20*j* rises upward. Here, steeper outer edges 31*j* of the sensitive membrane 20*j* contribute to greater stress on the stress change region of the diaphragm 10*j*. The sensitive membrane 20*j* in this embodiment has the structure in which the outer portion 20B is thicker than the central portion 20A. The outer edges 31*j* of such a sensitive membrane 20*j* are steeper than those of a sensitive membrane formed so that the thickness decreases gradually from the central portion toward outside by a typical manufacturing method. The diaphragm 10*j* on the upper surface of which the sensitive membrane 20*j* in this embodiment is formed therefore has greater stress on the stress change region than a diaphragm on the upper surface of which a sensitive membrane produced by the typical manufacturing method is formed.

As described above, in the stress sensor 1*j* according to this embodiment, the stress exerted to the region of the diaphragm 10*j* near the outer edges 31*j* is greater than that of a diaphragm on the upper surface of which a sensitive membrane produced by the typical manufacturing method is formed. Hence, the piezoresistive elements located in a region near the outer edges 31*j* have greater changes in resistance. This contributes to improved detection capability of the stress sensor 1*j* in detecting the stress applied to the diaphragm 10*j* when the substance to be detected is adsorbed by the sensitive membrane 20*j*. The stress sensor 1*j* thus has improved detection capability for the substance to be detected.

The stress sensor 1*j* according to this embodiment has the projection 32. For example, in the case where the sensitive membrane 20*j* is expanding, the projection 32 is subjected to a force from the sensitive membrane 20*j*. Here, since the projection 32 is connected to the diaphragm 10*j*, a moment acts with the intersection point between the inner surface of the projection 32 and the upper surface of the diaphragm 10*j* as a rotational axis. This improves the stress applied to the diaphragm 10*j*.

In the stress sensor 1*j* according to this embodiment, the piezoresistive elements may be disposed directly below the boundary between the sensitive membrane 20*j* and the projection 32. This improves the sensitivity of the stress sensor 1*j*.

In the stress sensor 1*j* according to this embodiment, the Young's modulus of the projection 32 may be higher than the Young's modulus of the sensitive membrane 20*j*. This reduces the deformation of the projection 32 itself when subjected to a force from the sensitive membrane 20*j*.

In the stress sensor 1*j* according to this embodiment, the Young's modulus of the projection 32 may be higher than the Young's modulus of the diaphragm 10*j*. This improves the stress applied to the diaphragm 10*j* while reducing the deformation of the projection 32 itself when a moment acts on the projection 32.

In this embodiment, the height of the projection 32 is greater than the width of the projection 32. The height of the projection 32 is the length in the z-axis direction. The width of the projection 32 is the length in a plane direction when the projection 32 is cut as illustrated in FIG. 2. In this embodiment, the height of the projection 32 is less than the height of the sensitive membrane 20*j*.

While some embodiments have been described above, various changes or modifications may be easily made by those of ordinary skill in the art based on the present disclosure. Such various changes or modifications are therefore included in the scope of the present disclosure. For example, the functions included in the components, steps, etc. may be rearranged without logical inconsistency, and a plurality of components, steps, etc. may be combined into one component, step, etc. and a component, step, etc. may be divided into a plurality of components, steps, etc. The components described in the foregoing embodiments can be combined as appropriate to form a stress sensor.

The invention claimed is:
1. A stress sensor comprising:
a diaphragm;
an intermediate layer disposed on a surface of the diaphragm;

a gas-sensitive membrane disposed on the intermediate layer; and a detector disposed in a region of the diaphragm in contact with an outer edge of the intermediate layer in a top view, wherein the detector has a portion located outside of the outer edge of the intermediate layer and a portion located inside of the outer edge of the intermediate layer in the top view.

2. The stress sensor according to claim 1, wherein a Young's modulus of the intermediate layer is lower than a Young's modulus of the diaphragm.

3. The stress sensor according to claim 1, wherein a thickness of the intermediate layer is less than a thickness of the gas-sensitive membrane.

4. The stress sensor according to claim 1, wherein the detector includes a piezoresistor.

5. The stress sensor according to claim 4, wherein the portion of the detector located outside of the outer edge is larger than the portion of the detector located inside of the outer edge.

6. The stress sensor according to claim 1, further comprising an additional detector disposed in a stress change region of the diaphragm at which a stress change arises due to a second notch,
wherein the diaphragm has a first notch in an outer peripheral portion, and
the gas-sensitive membrane has the second notch in an outer peripheral portion.

7. The stress sensor according to claim 6, wherein at least any of the first notch and the second notch is rectangle-shaped.

8. The stress sensor according to claim 6, wherein at least any of the first notch and the second notch is wedge-shaped.

9. The stress sensor according to claim 6, wherein the first notch and the second notch have matching notch lines.

10. The stress sensor according to claim 6, further comprising
a second gas-sensitive membrane disposed on an other surface of the diaphragm different from the surface at which the gas-sensitive membrane is disposed.

11. The stress sensor according to claim 6, wherein the stress change region is a region including an outer edge portion of the gas-sensitive membrane and a vicinity of the outer edge portion.

12. The stress sensor according to claim 1, further comprising an additional detector disposed in a region of the diaphragm including a region on which an outer edge of the gas-sensitive membrane is disposed,
wherein the diaphragm has a through region, and
the gas-sensitive membrane covers at least part of the through region.

13. The stress sensor according to claim 1, further comprising an additional detector that detects a deformation of the diaphragm associated with a change of the gas-sensitive membrane,
wherein the diaphragm has a first region and a second region thicker than the first region.

14. The stress sensor according to claim 1, wherein a thickness of a placement region of the diaphragm including the region where the detector is disposed is less than a thickness of a region of the diaphragm other than the placement region.

15. The stress sensor according to claim 1, further comprising:
a first detector disposed on the diaphragm;
a second detector disposed under the diaphragm; and
a connection portion,
wherein the first detector and the second detector are electrically connected in series by the connection portion.

16. The stress sensor according to claim 1, wherein the gas-sensitive membrane is configured to deform when absorbing a substance.

17. The stress sensor according to claim 1, wherein the detector is embedded in the diaphragm and in contact with the intermediate member only on a surface of the intermediate member facing the diaphragm.

* * * * *